(12) United States Patent
Tessien

(10) Patent No.: US 7,448,792 B2
(45) Date of Patent: *Nov. 11, 2008

(54) HYDRAULIC ACTUATED CAVITATION CHAMBER WITH INTEGRATED FLUID ROTATION SYSTEM

(75) Inventor: Ross Alan Tessien, Grass Valley, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 11/099,145

(22) Filed: Apr. 5, 2005

(65) Prior Publication Data

US 2006/0159561 A1 Jul. 20, 2006

Related U.S. Application Data

(63) Continuation-in-part of application No. 11/068,080, filed on Feb. 28, 2005, and a continuation-in-part of application No. 11/057,347, filed on Feb. 14, 2005, now abandoned, which is a continuation-in-part of application No. 11/038,344, filed on Jan. 18, 2005.

(51) Int. Cl.
*B01F 13/06* (2006.01)
*B01D 19/00* (2006.01)

(52) U.S. Cl. .................. 366/114; 366/117; 366/118; 366/139; 366/273; 95/30; 95/260; 95/266

(58) Field of Classification Search ............... 366/108, 366/114, 115, 117, 118, 120, 124, 136, 137, 366/139, 273, 274, 293; 95/30, 241, 247–250, 95/254, 260, 261, 266

See application file for complete search history.

(56) References Cited

U.S. PATENT DOCUMENTS

| 2,376,221 | A | * | 5/1945 | Baker | ............................ 95/30 |
| 4,333,796 | A | | 6/1982 | Flynn | |
| 4,563,341 | A | | 1/1986 | Flynn | |

(Continued)

FOREIGN PATENT DOCUMENTS

WO PCT/US95/15972 7/1996

(Continued)

OTHER PUBLICATIONS

Blake et al, Acoustic Cavitation: The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner*—David L Sorkin
(74) *Attorney, Agent, or Firm*—C. Brandon Browning; Maynard Cooper & Gale, PC

(57) ABSTRACT

A method for initiating cavitation within the fluid within a cavitation chamber is provided. In the cavitation preparatory steps, a hydraulically actuated piston is partially withdrawn and then the cavitation chamber is isolated. Once the chamber is isolated, the hydraulic piston is further withdrawn in order to form the desired cavities and then extended to implode the cavities. At least one impeller, located within the cavitation chamber, is rotated in order to stabilize the cavities.

29 Claims, 16 Drawing Sheets

U.S. PATENT DOCUMENTS

| | | | |
|---|---|---|---|
| 5,658,534 | A | 8/1997 | Desbourough et al. |
| 5,659,173 | A | 8/1997 | Putterman et al. |
| 5,858,104 | A | 1/1999 | Clark |
| 5,994,818 | A | 11/1999 | Abramov et al. |
| 2002/0090047 | A1 | 7/2002 | Stringham |
| 2005/0135532 | A1* | 6/2005 | Taleyarkhan et al. ........ 376/100 |

FOREIGN PATENT DOCUMENTS

| | | | |
|---|---|---|---|
| WO | WO 01/39200 | * | 5/2001 |
| WO | PCT/US02/16761 | | 12/2002 |
| WO | PCT/CA03/00342 | | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

Moss et al., Computed Optical Emissions from a Sonoluminescing Bubble, Physical Review E, Mar. 1999, pp. 2986-2992, vol. 59, No. 3, Published in: US.

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

A. Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

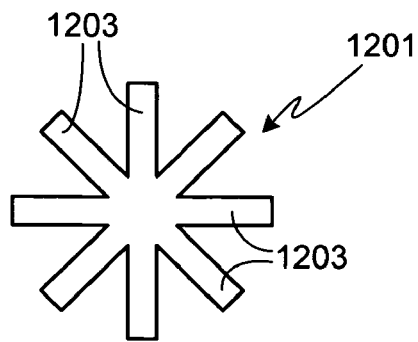
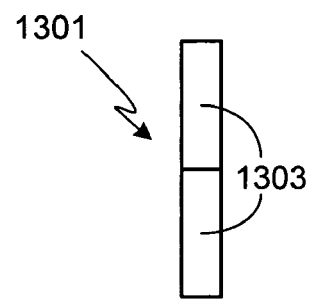
FIG. 12     FIG. 13
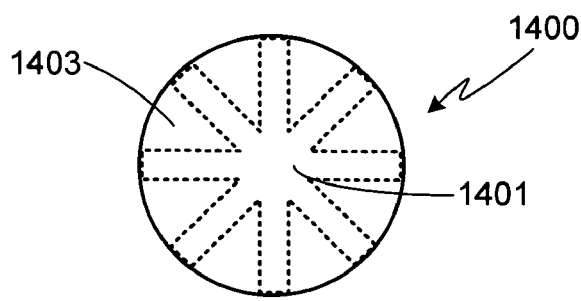
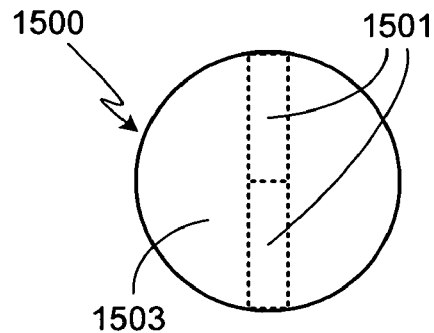
FIG. 14     FIG. 15
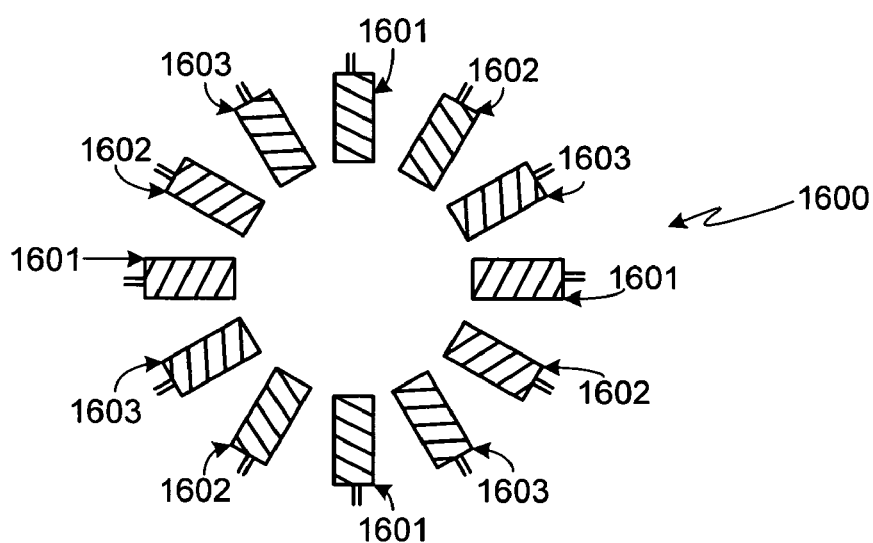
FIG. 16

HYDRAULIC ACTUATED CAVITATION CHAMBER WITH INTEGRATED FLUID ROTATION SYSTEM

CROSS-REFERENCES TO RELATED APPLICATIONS

This application is a continuation-in-part of U.S. patent application Ser. No. 11/068,080, filed Feb. 28, 2005 and Ser. No. 11/057,347, filed Feb. 14, 2005, now abandoned which is a continuation-in-part of Ser. No. 11/038,344, filed Jan. 18, 2005, the disclosures of which are incorporated herein by reference for any and all purposes.

FIELD OF THE INVENTION

The present invention relates generally to cavitation systems and, more particularly, to a method for cavitating stabilized bubbles within a cavitation chamber using a hydraulic actuated piston.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to further characterize the phenomena (e.g., effects of pressure on the cavitating medium) as well as its many applications (e.g., sonochemistry, chemical detoxification, ultrasonic cleaning, etc.).

Acoustic drivers are commonly used to drive the cavitation process. For example, in an article entitled *Ambient Pressure Effect on Single-Bubble Sonoluminescence* by Dan et al. published in vol. 83, no. 9 of Physical Review Letters, the authors use a piezoelectric transducer to drive cavitation at the fundamental frequency of the cavitation chamber. They used this apparatus to study the effects of ambient pressure on bubble dynamics and single bubble sonoluminescence.

U.S. Pat. No. 4,333,796 discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof and the cavitation medium is a liquid metal such as lithium or an alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn. The patent discloses that the temperatures achieved by a collapsing bubble depend strongly on whether or not the interface of the bubble and the host liquid remain spherical during collapse. Noting that the earth's gravitational field is an asymmetric force that can cause bubble deformation, the patent discloses that a preferred cavitation chamber includes means for applying a magnetic field to cancel the gravitational force, thus creating a zero-gravity field within the cavitation zone. Pat. No. 4,333,796 further discloses that if the bubble is cylindrical or quasi-cylindrical, small surface perturbations will neither grow nor decay. The patent discloses several means of achieving such a bubble shape, including imposing a time-varying magnetic field.

U.S. Pat. No. 4,563,341, a continuation-in-part of U.S. Pat. No. 4,333,796, discloses the use of a vertical standing pressure wave excited by a transducer in the bottom wall of the chamber as a means of reducing the effects of the earth's gravitational field within the cavitation zone.

U.S. Pat. No. 5,658,534 discloses a sonochemical apparatus consisting of a stainless steel tube about which ultrasonic transducers are affixed. The patent provides considerable detail as to the method of coupling the transducers to the tube. In particular, the patent discloses a transducer fixed to a cylindrical half-wavelength coupler by a stud, the coupler being clamped within a stainless steel collar welded to the outside of the sonochemical tube. The collars allow circulation of oil through the collar and an external heat exchanger. The abutting faces of the coupler and the transducer assembly are smooth and flat. The energy produced by the transducer passes through the coupler into the oil and then from the oil into the wall of the sonochemical tube.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber while another transducer delivers a compressional acoustic shock wave into the liquid. A flexible membrane separating the liquid from the gas reflects the compressional shock wave as a dilatation wave focused on the location of the object about which a bubble is formed.

U.S. Pat. No. 5,994,818 discloses a transducer assembly for use with tubular resonator cavity rather than a cavitation chamber. The assembly includes a piezoelectric transducer coupled to a cylindrical shaped transducer block. The transducer block is coupled via a central threaded bolt to a wave guide which, in turn, is coupled to the tubular resonator cavity. The transducer, transducer block, wave guide and resonator cavity are co-axial along a common central longitudinal axis. The outer surface of the end of the wave guide and the inner surface of the end of the resonator cavity are each threaded, thus allowing the wave guide to be threadably and rigidly coupled to the resonator cavity.

PCT Application No. US95/15972 discloses a non-periodically forced bubble fusion apparatus. The apparatus is comprised of a liquid-filled pressure vessel into which deuterium gas bubbles are injected. A non-periodic pressure field is generated within the liquid, the pressure field causing the bubbles to oscillate and become compressed thereby heating the bubbles to a temperature which is sufficiently high to cause a fusion reaction in the hot deuterium plasma formed at implosion stagnation. The application does not disclose any means of stabilizing the movement of the injected bubbles or positioning the bubbles within the pressure vessel.

PCT Application No. US02/16761 discloses a nuclear fusion reactor in which at least a portion of the liquid within the reactor is placed into a state of tension, this state of tension being less than the cavitation threshold of the liquid. In at least one disclosed embodiment, acoustic waves are used to pretension the liquid. After the desired state of tension is obtained, a cavitation initiation source, such as a neutron source, nucleates at least one bubble within the liquid, the bubble having a radius greater than a critical bubble radius. The nucleated bubbles are then imploded, the temperature generated by the implosion being sufficient to induce a nuclear fusion reaction.

PCT Application No. CA03/00342 discloses a nuclear fusion reactor in which a bubble of fusionable material is compressed using an acoustic pulse, the compression of the bubble providing the necessary energy to induce nuclear fusion. The nuclear fusion reactor is spherically shaped and filled with a liquid such as molten lithium or molten sodium. A pressure control system is used to maintain the liquid at the desired operating pressure. To form the desired acoustic pulse, a pneumatic-mechanical system is used in which a plurality of pistons associated with a plurality of air guns strike the outer surface of the reactor with sufficient force to form a shock wave within the liquid in the reactor. The application discloses releasing the bubble at the bottom of the chamber and applying the acoustic pulse as the bubble passes through the center of the reactor. A number of methods of determining when the bubble is approximately located at the center of the reactor are disclosed.

In a paper entitled *Sonoluminescence and Bubble Dynamics for a Single, Stable, Cavitation Bubble* (J. Acoust. Soc. Am. 91 (6), June 1992), Felipe Gaitan et al. modeled the motion of acoustically driven bubbles based on the results of their single bubble experiments. The authors' experimental apparatus included a liquid filled levitation cell in which a stationary acoustic wave was excited, the stationary wave counteracting the hydrostatic or buoyancy force, thus stabilizing a bubble injected into the cell and allowing it to remain suspended in the liquid indefinitely.

Avik Chakravarty et al., in a paper entitled *Stable Sonoluminescence Within a Water Hammer Tube* (Phys Rev E 69 (066317), Jun. 24, 2004), investigated the sonoluminescence effect using a water hammer tube rather than an acoustic resonator, thus allowing bubbles of greater size to be studied. The experimental apparatus employed by the authors included a sealed water hammer tube partially filled with the liquid under investigation. The water hammer tube was mounted vertically to the shaft of a moving coil vibrator. Cavitation was monitored both with a microphone and a photomultiplier tube. To stabilize the bubbles within the water hammer tube and minimize the effects of the tube walls, in one embodiment the tube was rotated about its axis.

Although a variety of cavitation systems have been designed, typically these systems operate at relatively low pressure, utilize acoustic drivers to cavitate extremely small bubbles, and suffer from a variety of shortcomings due to the inherent instability of the cavitating bubbles. The present invention overcomes these limitations by providing a system that operates at high pressures and that can be used to form and cavitate very large, stabilized bubbles.

SUMMARY OF THE INVENTION

The present invention provides a method for initiating cavitation within the fluid within a cavitation chamber. In the cavitation preparatory steps, a hydraulically actuated piston is partially withdrawn and then the cavitation chamber is isolated. Once the chamber is isolated, the hydraulic piston is further withdrawn in order to form the desired cavities and then extended to implode the cavities. At least one impeller, located within the cavitation chamber, is rotated in order to stabilize the cavities.

In at least one embodiment, an externally mounted motor is coupled to the impeller and used to rotate the impeller. Impeller rotation can be continuous throughout piston retraction/extension cycling; or initiated after completion of the piston retraction step; or terminated prior to initiating final piston retraction; or terminated prior to initiating piston extension. If impeller rotation is terminated prior to completing piston retraction, preferably the blades of the impeller are positioned to minimize interference between the impeller and the piston, for example by maximizing the distance between the impeller blades and the cavitation piston. Similarly, if impeller rotation is terminated prior to initiating piston extension, preferably the blades of the impeller are positioned to minimize interference between the impeller and the piston, for example by maximizing the distance between the impeller blades and the cavitation piston.

In at least one embodiment of the invention, the cavitation fluid is degassed prior to rotating the cavitation fluid within the cavitation chamber or retracting/extending the cavitation piston. The degassing step can be performed within the cavitation chamber or within a separate degassing chamber. If a separate degassing chamber is used, preferably it is coupled to the cavitation chamber via a circulatory system. The degassing step can be performed using a vacuum pump, acoustic drivers coupled to the degassing chamber, or both.

In at least one embodiment of the invention, cross-contamination between the cavitation fluid and the hydraulic fluid is minimized by interposing a coupling sleeve between the hydraulic driver and the cavitation chamber. Preferably the coupling sleeve is evacuated.

A further understanding of the nature and advantages of the present invention may be realized by reference to the remaining portions of the specification and the drawings.

BRIEF DESCRIPTION OF THE DRAWINGS

FIG. 12 is an end view of a ferromagnetic impeller rotor;

FIG. 13 is an end view of a permanent magnet impeller rotor;

FIG. 14 is an end view of the impeller rotor of FIG. 12 embedded within a second material in order to eliminate rotor edges;

FIG. 15 is an end view of the impeller rotor of FIG. 13 embedded within a second material in order to eliminate rotor edges;

FIG. 16 is an end view of a stator;

DESCRIPTION OF THE SPECIFIC EMBODIMENTS

System Overview

Figure 1:
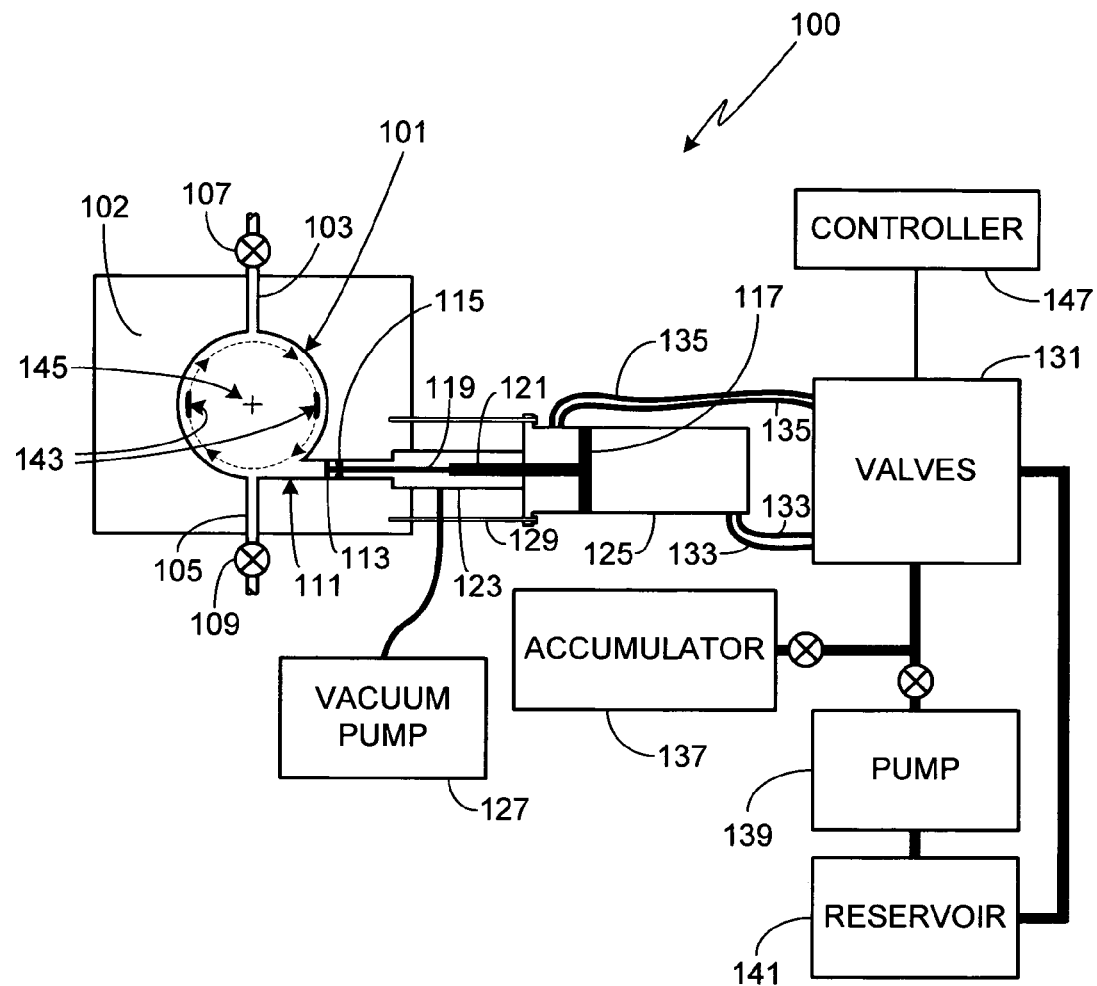
FIG. 1 is a cross-sectional view on an exemplary embodiment.
Figure 2:
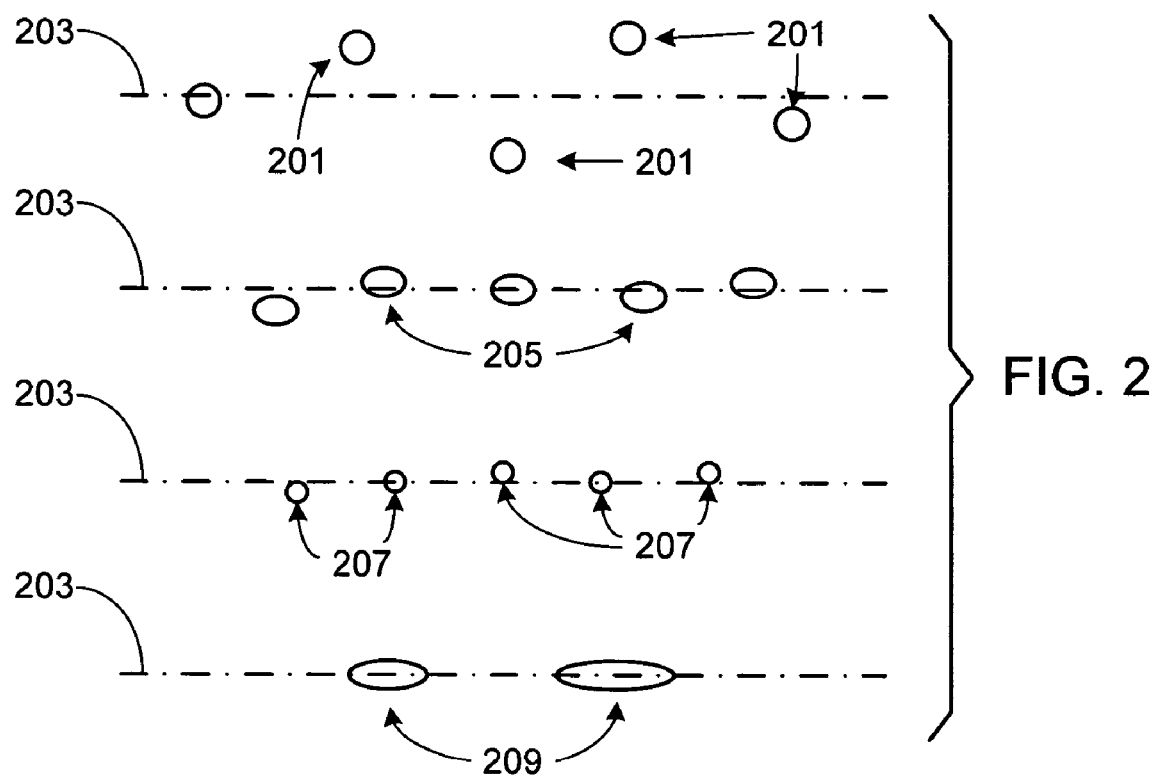
FIG. 2 illustrates the effects of cavitation fluid rotation on a plurality of bubbles contained within a cavitation chamber.

FIG. 1 is a cross-sectional view of the principal elements of the invention implemented in an exemplary embodiment. The primary component of system 100 is the cavitation chamber 101. Although in the illustrated embodiment cavitation chamber 101 is cylindrically-shaped, it will be appreciated that the invention is not so limited and that cavitation chambers of other configurations (e.g., spherical, conical, cubical, rectangular, etc.) can also be used with the present invention. Chamber 101 must be fabricated to withstand high operating pressures, preferably pressures of at least 1,000 PSI, more preferably pressures of at least 10,000 PSI, and still more preferably pressures of at least 100,000 PSI. Additionally, chamber 101 should be designed to properly seal when evacuated, thus allowing degassing procedures to be performed in situ. Typically chamber 101 is fabricated from multiple pieces which are subsequently held together using brazing, a plurality of bolts, or other means. It will be appreciated that if chamber 101 is fabricated from multiple pieces, suitable sealing means (e.g., o-rings, gaskets, etc.) must be used to seal the individual pieces together, thus allowing the chamber to operate at the desired pressures. In the illustrated embodiment, chamber 101 is fabricated from a single block of material 102, for example stainless steel, into which a cylindrical hole has been bored.

Chamber 101 can be fabricated from any of a variety of materials although there are some constraints placed on the chamber material. First, the material is preferably machinable, thus simplifying the fabrication process. Second, the material should be conducive to high pressure operation. Third, if the chamber is to be operated at a high temperature, the chamber material should have a relatively high melting temperature. Additionally, depending upon the process used to assemble individual chamber pieces together (e.g., brazing), a high melting temperature may be desirable as an aid to fabrication and assembly. Fourth, the chamber material should be corrosion resistant, thus allowing the chamber to be used repeatedly and with a variety of liquids. Fifth, the material should be hard enough to allow a good surface finish to be obtained. In one preferred embodiment of the invention, the chamber is fabricated from 17-4 precipitation hardened stainless steel.

With respect to the dimensions of the chamber, both inner and outer dimensions, the selected sizes depend upon the intended use of the chamber. For example, smaller chambers are typically preferable for situations in which it is desirable to limit the amount of cavitating medium, for example due to the cost of the medium, or when extremely high peak pressures are desired. On the other hand large chambers, with inside dimensions on the order of 8-10 inches or greater, simplify experimental set-up and event observation, and allow for implosion of larger cavities. Thick chamber walls are preferable, both due to the high operating pressures encountered during chamber operation and as a means of simplifying the coupling of the hydraulic driver to the chamber as described in detail below. In the illustrated embodiment, cylindrical cavitation chamber 101 is 6 inches long with an inside diameter (ID) of 3 inches.

As described more fully below, the cavitation medium is degassed prior to the use of the hydraulic driver of the invention. Degassing the cavitation fluid is crucial in order for the collapsing bubbles within the cavitation chamber to achieve the desired high velocities, and thus high temperatures and pressures, at implosion stagnation. The cavitation fluid can be degassed within chamber 101, degassed in a separate degassing chamber, or degassed in stages such that one stage of degassing is performed prior to chamber filling and a second stage of degassing is performed within the chamber. Regardless of where the cavitation fluid is degassed, chamber 101 preferably includes a pair of inlets 103 and 105 thus allowing the chamber to be filled, drained, etc. Preferably inlets 103 and 105 are located at the top and bottom portions, respectively, of chamber 101, and more preferably located at the uppermost and lowermost portions of chamber 101 as shown, thereby helping to prevent gas bubbles from being trapped within chamber 101. Inlets 103/105 include valves 107/109, respectively.

As shown in FIG. 1, a hole 111 is bored into the side of chamber 101 such that it intersects a lower portion of the cavitation chamber. Although this configuration is preferred, it should be understood that the hydraulic driver does not have to be coupled at a specific angle or at a specific location relative to the cavitation chamber in order to drive cavitation within the chamber.

Within hole 111 is cavitation drive piston 113, piston 113 having an outside diameter (OD) of 0.690 inches in this embodiment. One or more seals 115 prevent leakage of the cavitation medium around piston 113 during the piston stroke. In the preferred embodiment, cavitation drive piston 113 is coupled to a hydraulically actuated piston 117 via a two-part piston rod, i.e., rod portions 119 and 121. Preferably rod portions 119 and 121 are threadably coupled together. The two-part piston rod design simplifies assembly/disassembly as well as system maintenance. Furthermore, in terms of research and development devices, this design allows a single hydraulic piston to be easily coupled to any of a variety of cavitation chambers and cavitation pistons, thus providing system flexibility at minimal cost. Lastly, this arrangement provides a simple method of altering the pressure applied by piston 113 to the cavitation medium. Specifically, since the peak applied pressure is directly proportional to the effective area of the piston, pressure changes can be made by altering the ratio of the areas of hydraulic piston 117 and cavitation drive piston 113.

Due to the need to accommodate piston 113 from full extension to full retraction, i.e., the piston stroke, either the wall thickness of chamber housing 102 must be appropriately sized or an additional sleeve (i.e., a spacer) must be added to accommodate the piston stroke. In the illustrated embodiment, with a piston stroke of 3 inches, a coupling sleeve 123 is introduced between housing 102 and hydraulic cylinder 125. In addition to being more economical than sizing chamber housing 102 to accommodate the entire piston stroke, coupling sleeve 123 provides further separation between the hydraulic liquid driving the hydraulic piston (i.e., piston 117) and the cavitation fluid within chamber 101, thus helping to prevent contamination of either fluid by the other fluid due to a faulty seal. Preferably coupling sleeve 123 is coupled to a vacuum pump 127, thus allowing the sleeve to be evacuated. The inventor has found that by evacuating sleeve 123 air leakage into chamber 101 is reduced, air leakage leading to a cushioning of the desired cavitation implosions.

Although not required, in the preferred embodiment coupling sleeve 123 is counter-bored into housing 102 and subsequently welded in place. Alternate methods of coupling sleeve 123 to housing 102 include bolts, a threaded hole/collar arrangement, brazing, bonding, etc. In the preferred embodiment, hydraulic cylinder 125 is held in place via a plurality of bolts 129. Alternately, cylinder 125 can be brazed, bonded, or threadably coupled to sleeve 123. Suitable hydraulic cylinders are manufactured by Ortman, for example Ortman 3T-NQ with a 2.5 inch bore, 3 inch stroke and a 1 inch piston rod.

Hydraulic cylinder 125 is coupled to a valve 131 by hydraulic lines 133/135. Although valve 131 can be manually operated, preferably it is a solenoid operated valve(s) (e.g., Continental high flow solenoid operated valves). Valve 131 applies forward pressure to piston 117 through hydraulic lines 133, thus causing piston 117 and coupled piston 113 to become extended. Retraction of piston 117 and coupled piston 113 is caused by valve 131 applying backward pressure via hydraulic lines 135. Although a single hydraulic line 133 and a single hydraulic line 135 can be used to extend and retract piston 117, utilizing multiple lines 133/135 allow for more rapid extension/retraction of the pistons. Rapid extension of the pistons is further aided by the use of a nitrogen loaded, bladder type accumulator 137. Valve 131 is also coupled to a hydraulic pump 139 (e.g., Bosch vane type pump) and a reservoir 141. The cycling of valve 131, and thus hydraulic piston 117 and coupled cavitation piston 113, is controlled by controller 147.

Within chamber 101 is an impeller which, in the illustrated embodiment, is comprised of a pair of impeller blades 143. The impeller is either directly or indirectly (e.g., magnetically) coupled to a motor, not shown, that rotates the impeller about an axis 145. Indirect coupling offers the advantage of allowing the entire impeller assembly to be contained within chamber 101, thus making it easier to seal the chamber as the need for drive shaft seals is eliminated.

The impeller of the invention serves many purposes. First, the impeller helps to keep cavitating bubbles, regardless of their size, away from the inner chamber surfaces, thus insuring that the imploding bubbles are completely surrounded by liquid. As a result, the implosion symmetry and peak stagnation temperature and pressure of the imploding bubbles are improved. Second, the impeller centers the bubble or bubbles along the impeller's axis. Therefore if the impeller axis is maintained in a horizontal plane, as preferred, the impeller's rotation can be used to overcome the bubble's tendency to drift upward through the chamber. This benefit is especially important with larger bubbles such as those preferably created using the hydraulic driver of the present invention. Third, the impeller can be used to improve the sphericity of the bubbles during the cavitation process, in particular during the period of cavitation in which the bubbles are collapsing. As a result, smaller bubble diameters can be achieved prior to bubble deformation or disintegration.

Once bubbles are formed using the hydraulic piston, as described more fully below, the impeller enclosed with the cavitation chamber can have a variety of effects on the bubbles depending upon the rotational velocity of the impeller, the length of time the impeller has been rotating, cavitation fluid pressure, cavitation fluid composition, density and surface tension. For example, immediately after the impeller starts to rotate and assuming a relatively low impeller rotation velocity, bubbles 201 are drawn toward the rotational axis 203. During this stage of rotation and with low rotation velocities, the bubbles remain quasi-spherical in shape as the force exerted by the rotating fluid is insufficient to overcome the bubbles' tendency to assume a spherical shape, thereby minimizing the bubble's surface tension. As the rotational velocity increases, the bubbles 205 are drawn more forcefully towards the rotational axis 203. Simultaneously, bubbles 205 begin to elongate as illustrated. At this stage typically there is a 'string' of bubbles formed along the rotational axis, the sphericity of each of the bubbles depending strongly on the rotational velocity of the fluid as well as the size of the individual bubbles. For example bubbles 205, as shown, have begun to elongate while smaller bubbles 207, at the same fluid rotation velocity, remain quasi-spherical in shape. If the bubbles are sufficiently large, or the rotational velocity sufficiently high, often multiple bubbles will coalesce into larger, elongated bubbles 209, the number and size of bubbles 209 depending upon the number of bubbles, their sizes, and the rotational velocity. Whether the bubbles are vapor filled (evacuated) or gas filled (for example, with gases to be reacted), their behavior is substantially the same.

The impeller can either be rotated continuously or non-continuously. Due to the force exerted by cavitation piston 113 and the initial localization of that force within hole 111, preferably neither impeller blade 143 is located at the intersection of hole 111 and chamber 101 during the retraction of piston 113 or during the extension of piston 113, thus minimizing interference between the impeller and the cavitation piston. Such interference minimization can be achieved, for example, by maximizing the distance between all impeller blades 143 and hole 111/cavitation piston 113. By preventing an impeller blade from being located near the intersection of hole 111 and chamber 101 during piston cycling, potential damage to the impeller blades (e.g., blade bending) can be prevented. In order to accomplish this goal, preferably the impeller controller (e.g., controller 303 shown in FIG. 3) and the piston controller (i.e., controller 147) time the rotation of the impeller and the cycling of piston 113 to insure that the impeller blades are not located near the intersection of hole 111 and chamber 101 during piston cycling. Alternately, the impeller blades can be rotated prior to piston cycling and then stopped at a location other than the intersection of hole 111 and chamber 101 prior to piston cycling. As the cavitation fluid will continue to rotate for a short period of time after impeller rotation cessation, some of the beneficial effects of the impeller are still realized. If desired, impeller rotation can be re-initiated after piston cycling or after the first cycle half (i.e., piston retraction). Alternately, piston 113 can be retracted, thereby creating one or more bubbles, prior to rotation of the impeller. The impeller can then be rotated in order to center and/or stabilize the bubble(s). Then after bubble stabilization, the impeller blades can be stopped, preferably at a location other than the intersection of hole 111 and chamber 101, and the piston extended, thereby causing the implosion of the cavity. Alternately, the impeller assembly can be designed to insure that the blades and assembly can withstand operation of the cavitation piston, thus allowing continuous rotation of the impeller during piston cycling. Design considerations to insure such operation include material selection (e.g., titanium), blade thickness, and impeller assembly dimensions (e.g., distance between blades 143 and the inner wall of chamber 101).

As previously noted, a variety of different bubble geometries can be achieved by varying the impeller rotation velocity, selecting either continuous or non-continuous impeller rotation, and controlling the bubble density and bubble volume. Additionally it will be appreciated that other parameters such as impeller design and cavitation fluid composition affect the bubble geometry. With respect to composition, the two primary attributes of the selected cavitation medium which control the response of a bubble to the rotating impeller is the medium's viscosity and surface tension. Increasing the viscosity of the cavitation medium affects the ease by which the impeller can rotate within the fluid as well as the rate at which bubbles can move within the fluid, both during impeller rotation and after cessation of impeller rotation. The surface tension affects the extent of bubble elongation in response to impeller rotation.

Impeller Design

Figure 3:
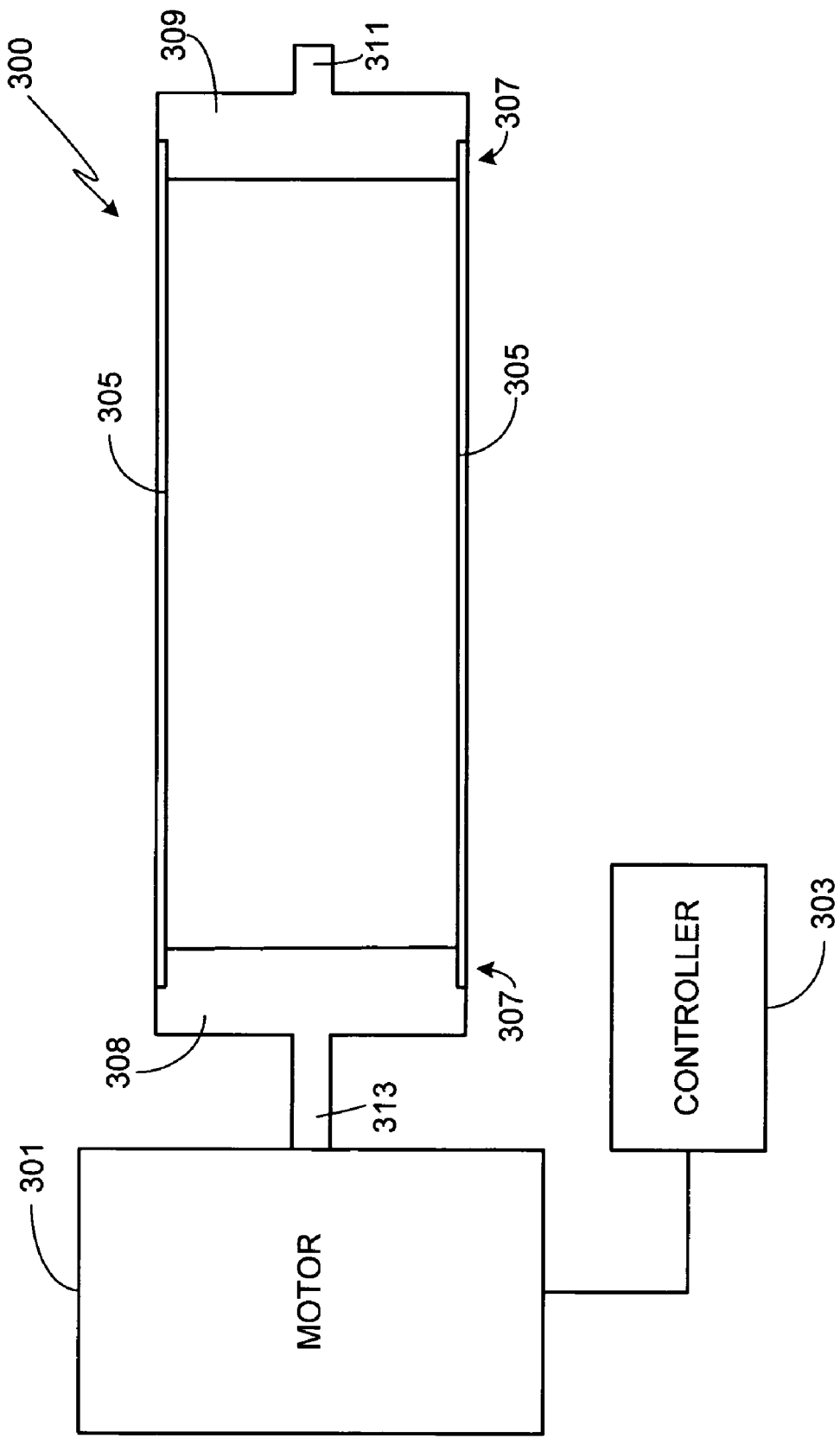
FIG. 3 is an illustration of a two-bladed impeller assembly suitable for use with a cylindrical cavity.

The invention is not limited to a specific design for the impeller assembly, chamber, or hydraulic driver. For example, the impeller can be either mechanically coupled or magnetically coupled to the impeller motor. FIG. 3 is an illustration of a two-bladed impeller assembly 300 suitable for use with a cylindrical cavity, such as that shown in FIG. 1.

Figure 4:
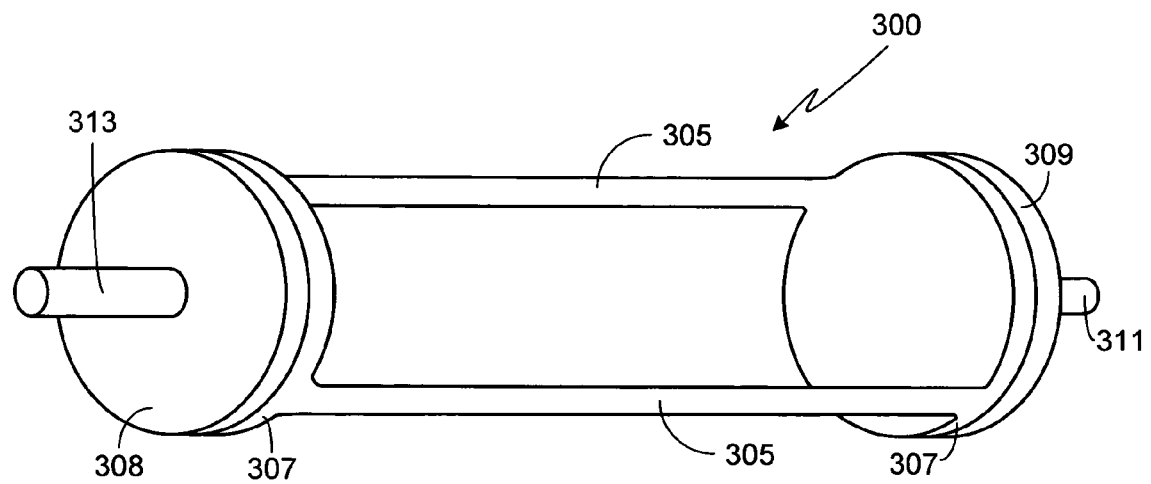
FIG. 4 is a perspective view of the impeller shown in FIG. 3.

Impeller assembly 300 is mechanically coupled to a drive motor 301 which is attached to controller 303. As previously noted and as shown in FIG. 3 and the impeller prospective view of FIG. 4, impeller assembly 300 has a pair of impeller blades 305. Note that in FIG. 4, impeller assembly 300 has been rotated to provide a clearer view of impeller blades 305. For applications in which stable on-axis bubbles are desired, preferably the outside diameter of impeller assembly 300 is smaller than the inside diameter of the cavitation chamber by a sufficient amount to minimize wall turbulence that can be caused by rotating the impeller blades in near proximity to the cavity wall. For applications in which bubble clouds are desired, preferably impeller assembly 300 utilizes thick impeller blades and the outside diameter of the impeller is only slightly smaller than the inside of the cavitation chamber, thereby maximizing wall turbulence.

For ease of fabrication, impeller assembly 300 is fabricated from a cylinder. In one exemplary embodiment the cylinder is 6 inches long with an outside diameter of 2.5 inches and a wall thickness of 0.0625 inches. Preferably impeller assembly 300 is fabricated from a metal such as stainless steel. During impeller fabrication, most of the wall of the cylinder is machined away, leaving only blades 305 and a portion 307 of the cylinder at either end. Cylinder end caps 308 and 309 are attached to end portions 307 using any of a variety of means, including but not limited to press-fitting, bonding, brazing or bolting the pieces together. As shown in further detail below, end cap 309 includes a spindle 311 which confines the axis of rotation of the impeller along the centerline of the chamber. End cap 308 includes a drive shaft 313, the drive shaft providing a means for coupling impeller assembly 300 to motor 301. Although the invention does not require that impeller 300 use two blades 305 as shown, the inventor has found that two blades provide sufficient fluid rotation capabilities while also providing a strong mechanical design. Other impeller configurations, however, are clearly envisioned (e.g., three blades, four blades, etc.). The primary requirements placed on the number and locations of the impeller blades are (i) balanced and stable operation during rotation and (ii) minimization of impeller created turbulence (assuming bubble clouds are not desired).

Figure 5:
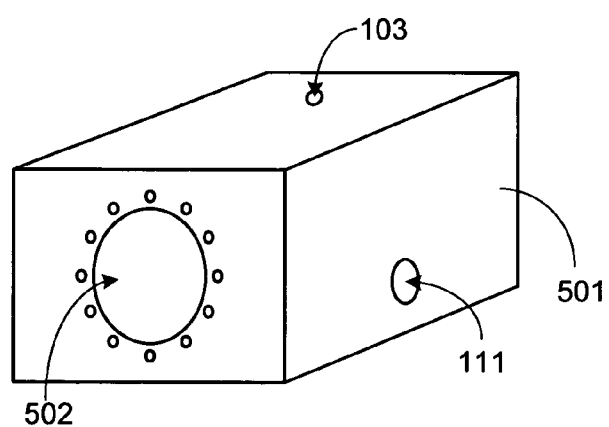
FIG. 5 is a perspective view of the external body portion of a cylindrical cavitation chamber for use with the impeller shown in FIGS. 3 and 4.

FIG. 5 is a perspective view of the external body portion of a cylindrical cavitation chamber, such as the one shown in FIG. 1, for use with impeller assembly 300. To simplify fabrication, the chamber is fabricated from a single piece of material 501, preferably stainless steel. A cylindrical hole 502 is bored into block 501 such that impeller assembly 300 fits within the hole as shown in the chamber/impeller cross-sectional view of FIG. 6. For the sake of illustration simplicity, FIG. 6 does not include those aspects of the invention corresponding to the cavitation piston and associated hardware. Assuming an impeller with an outside diameter of 2.5 inches, preferably the inside diameter of cavitation cavity 600 is 3.0 inches. Although hole 502 need not be bored completely through block 501 as shown, the inventor has found that chamber assembly and maintenance is simplified by doing so. Accordingly the preferred embodiment of the invention uses a pair of end caps 601/603 to seal chamber 600, the end caps preferably bolted to block 501 with a plurality of bolts 605 and sealed with one or more sealing members 607 (e.g., o-rings). End cap 601 includes one or more bearings 609 to insure proper rotation of impeller spindle 311, and thus impeller 300. End cap 603 preferably includes at least one bearing 611 and multiple seals 613. A secondary end cap 615 with sealing members 617 (e.g., o-rings) may be used, as shown, to hold seals 613 and bearings 611 in place and to provide additional sealing of the chamber. Preferably multiple Teflon o-rings 619 are inset into both end caps 601/603 as shown, o-rings 619 helping to seal chamber 600 as well as providing a low friction surface between the impeller end caps and the chamber end caps.

The sealing members (i.e., seals 607, 613 and 617) are designed to insure that cavitation chamber 600 can be either evacuated, preferably to a pressure of less than the vapor pressure of the cavitation fluid, or pressurized, preferably to a pressure of at least 1,000 PSI, more preferably to a pressure of at least 10,000 PSI, and still more preferably to a pressure of at least 100,000 PSI. Thus the sealing members are designed to allow the chamber to be either evacuated for degassing or pressurized during operation. It will be appreciated that the invention is not limited to a particular seal arrangement and that there are numerous means for adequately sealing chamber 600. The exact nature of a particular seal depends on whether the surfaces to be sealed are static, such as end cap 603 and chamber body 501, or dynamic, such as drive shaft 313 and end cap 603. Depending upon the intended cavitation medium as well as the desired pressure ranges, a variety of sealing member types can be used with the invention including, but not limited to, o-rings, static packing seals such as gaskets and dynamic packing seals such as flanges, rings, and adjustable soft packings.

As noted with respect to FIG. 1, preferably chamber 600 includes a pair of chamber inlets 103/105, thus allowing the chamber to be filled, drained and/or coupled to a cavitation fluid circulatory system as described further below as well as in co-pending U.S. patent application Ser. No. 11/001,720, filed Dec. 1, 2004, the entire disclosure of which is incorporated herein for any and all purposes.

Although the impeller assembly can be mechanically driven as described in detail relative to FIGS. 3-6, the impeller can also be magnetically coupled/driven as described more fully below.

Figure 7:
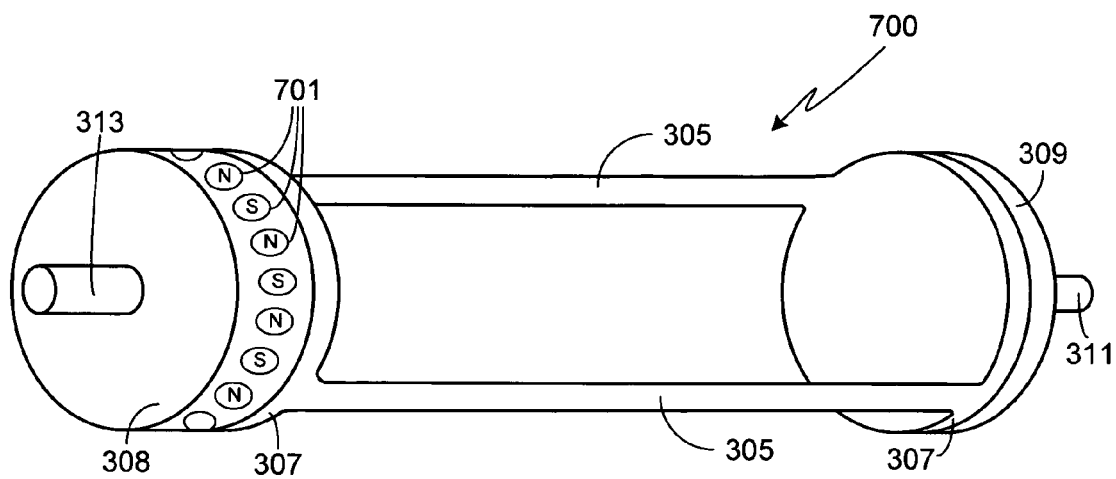
FIG. 7 is a perspective view of a magnetically coupleable impeller.
Figure 8:
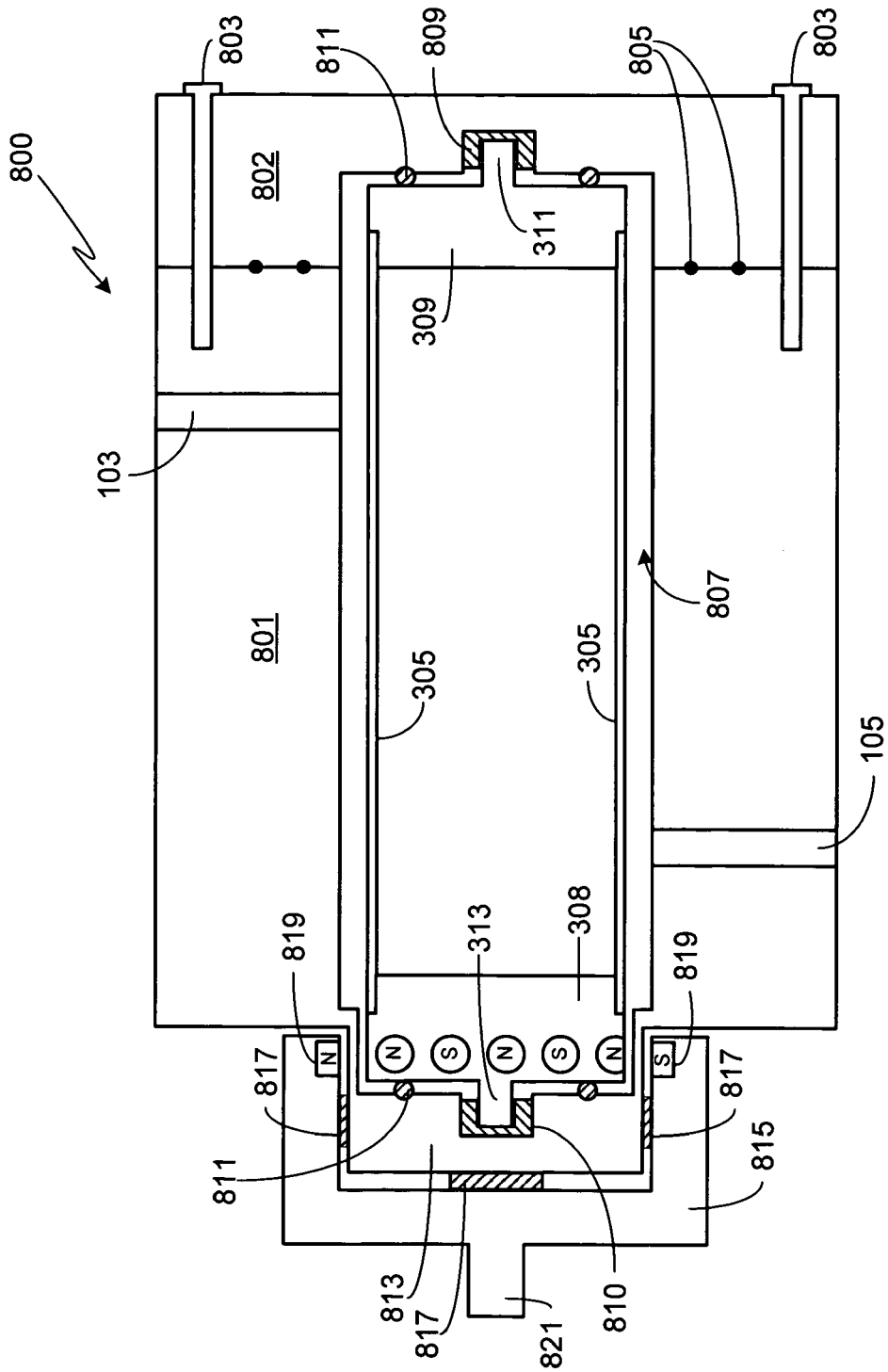
FIG. 8 is a cross-sectional view of a cavitation chamber utilizing the impeller shown in FIG. 7.

FIGS. 7-8 illustrate an embodiment of an impeller assembly suitable for use with cylindrical chamber 101 of FIG. 1. As in the above figures depicting a mechanically coupled impeller assembly, FIGS. 7-8 do not include those aspects of the invention directed to the cavitation piston/driver assembly. Furthermore, the operation and design of impeller assembly 700 is similar to impeller assembly 300 except for the inclusion of at least one permanent magnet 701, and preferably a plurality of permanent magnets 701 of alternating magnetic polarity, in cylinder end cap 308. Additionally, spindle 313 is shorter in this embodiment of the impeller assembly as it does not need to be long enough to be mechanically coupled to an external motor.

FIG. 8 is a cross-sectional view of impeller 700 within chamber 800. In the illustrated embodiment, chamber 800 is comprised of two sections, 801 and 802, bolted together with a plurality of bolts 803. One or more sealing members 805 (e.g., o-rings) provide the desired seal between sections 801 and 802. Sealing members 805 are designed to insure that cavitation chamber 800 can be either evacuated, preferably to a pressure of less than the vapor pressure of the cavitation fluid, or pressurized, preferably to a pressure of at least 1,000 PSI, more preferably to a pressure of at least 10,000 PSI, and still more preferably to a pressure of at least 100,000 PSI. Thus the sealing members are designed to allow the chamber to be either evacuated for degassing or pressurized during operation. It will be appreciated that the invention is not limited to a particular seal arrangement and that there are numerous means for adequately sealing chamber 800.

A cylindrical hole 807 is bored into sections 801 and 802 such that impeller 700 fits within the hole as shown in the chamber cross-sectional view of FIG. 8. Spindles 311 and 313, and thus impeller 700, are centered within hole 807 using bearings 809 and 810, respectively. In addition to centering impeller 700, bearings 809 and 810 insure the free rotation of the impeller. In one embodiment, bearings 809 and 810 are fabricated from a material with a low coefficient of friction, such as Teflon. To insure that end caps 308 and 309 of impeller 700 do not rub against sections 801 and 802 of chamber 800, preferably one or more spacers 811 are interposed between the end caps and the chamber internal surfaces as shown. In one embodiment, spacers 811 are comprised of Teflon o-rings. It will be appreciated that although bearings 809/810 and spacers 811 are preferably comprised of Teflon, alternate materials may be required depending upon the composition, temperature and corrosive characteristics of the cavitation medium.

In the illustrated embodiment, the outer surface of end portion 813 of chamber section 801 is cylindrically shaped. A cup-shaped member 815 is configured to rotate about end portion 813. Optionally one or more spacers 817, for example Teflon spacers, are used to insure the smooth rotation of member 815. Embedded within an internal surface of member 815 adjacent to the external surface of end cap 308 is a plurality of permanent magnets 819 of alternating magnetic polarity. A drive shaft 821 of member 815 is coupled to a drive motor and associated controller (e.g., drive motor 301 and controller 303), not shown. Due to the magnetic field generated by magnets 819 and its interaction with the magnetic field generated by magnets 701, rotation of member 815 causes the rotation of impeller 700 within chamber 800. Similarly, impeller 700 can be positioned within chamber 800 by controlling the rotational position of member 815.

Figure 6:
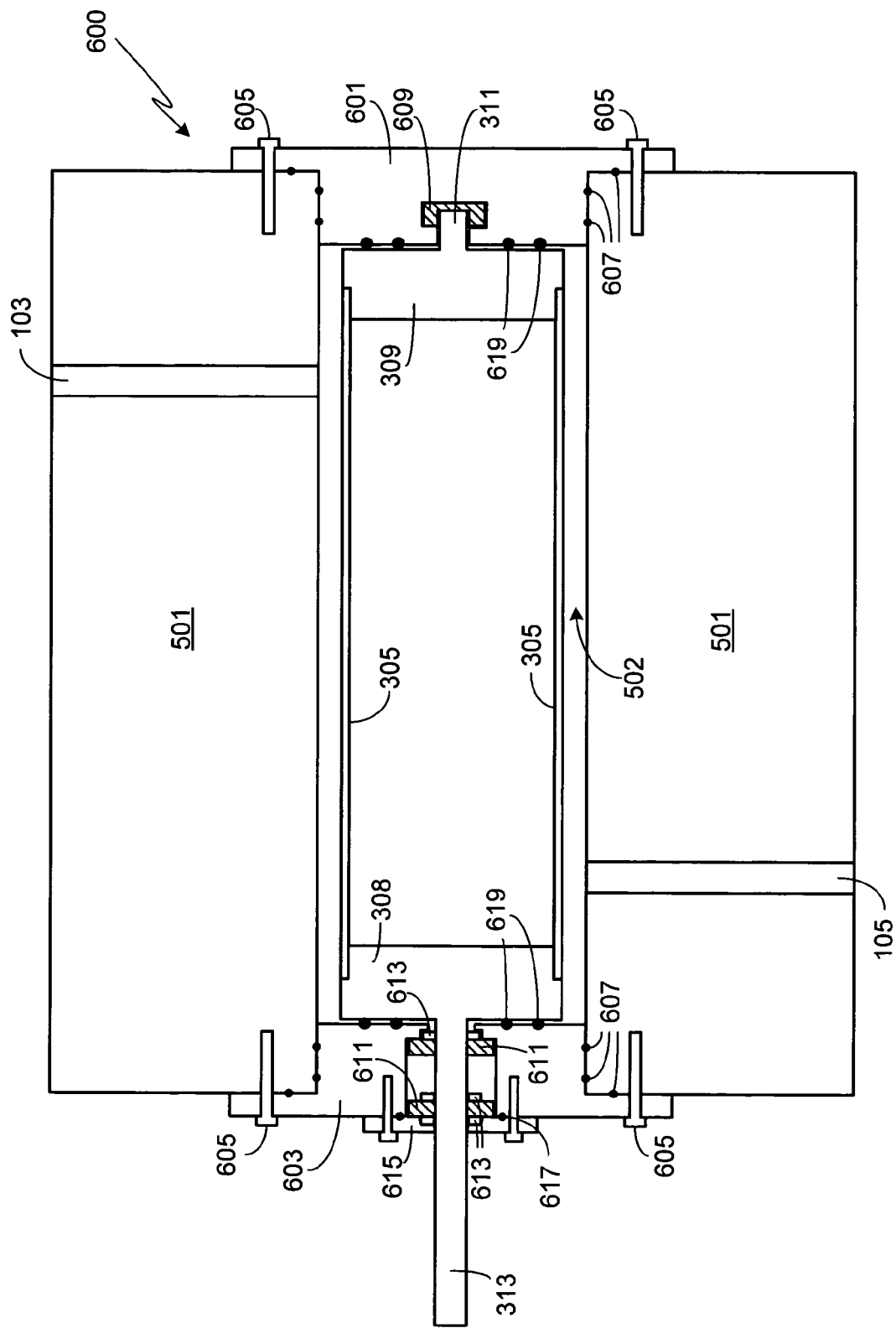
FIG. 6 is a cross-sectional view of the impeller assembly shown in FIGS. 3 and 4 and the chamber shown in FIG. 5.

As noted with respect to FIGS. 1 and 6, preferably the embodiment of chamber 800 shown in FIG. 8 also includes a pair of chamber inlets 103/105.

In addition to the previously cited selection criteria for the chamber material, this embodiment of the invention requires that the material should be relatively transparent to the magnetic fields generated by magnets 701 and 819, thus insuring that the rotation of member 815 results in the rotation of impeller 700.

Figure 9:
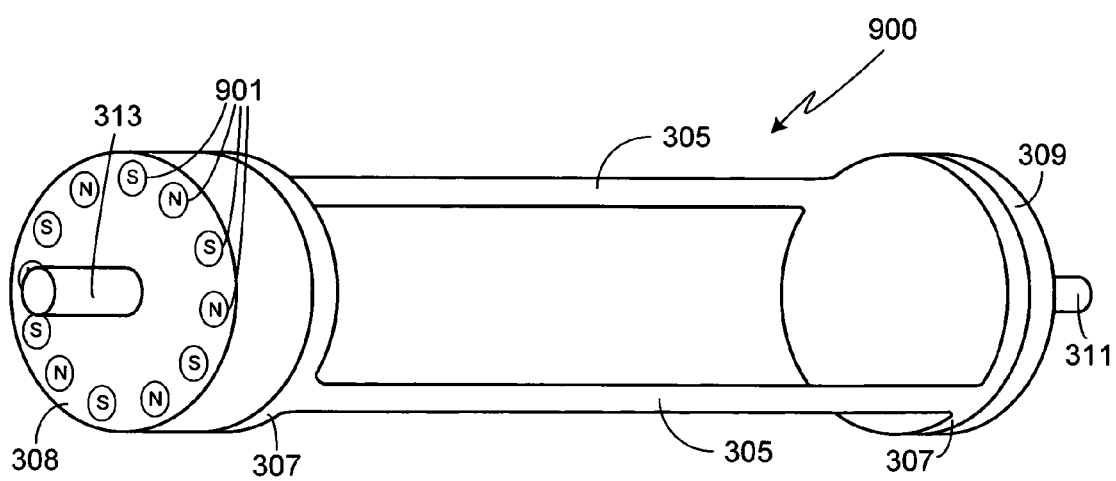
FIG. 9 is a perspective view of an alternate embodiment of a magnetically coupleable impeller.
Figure 10:
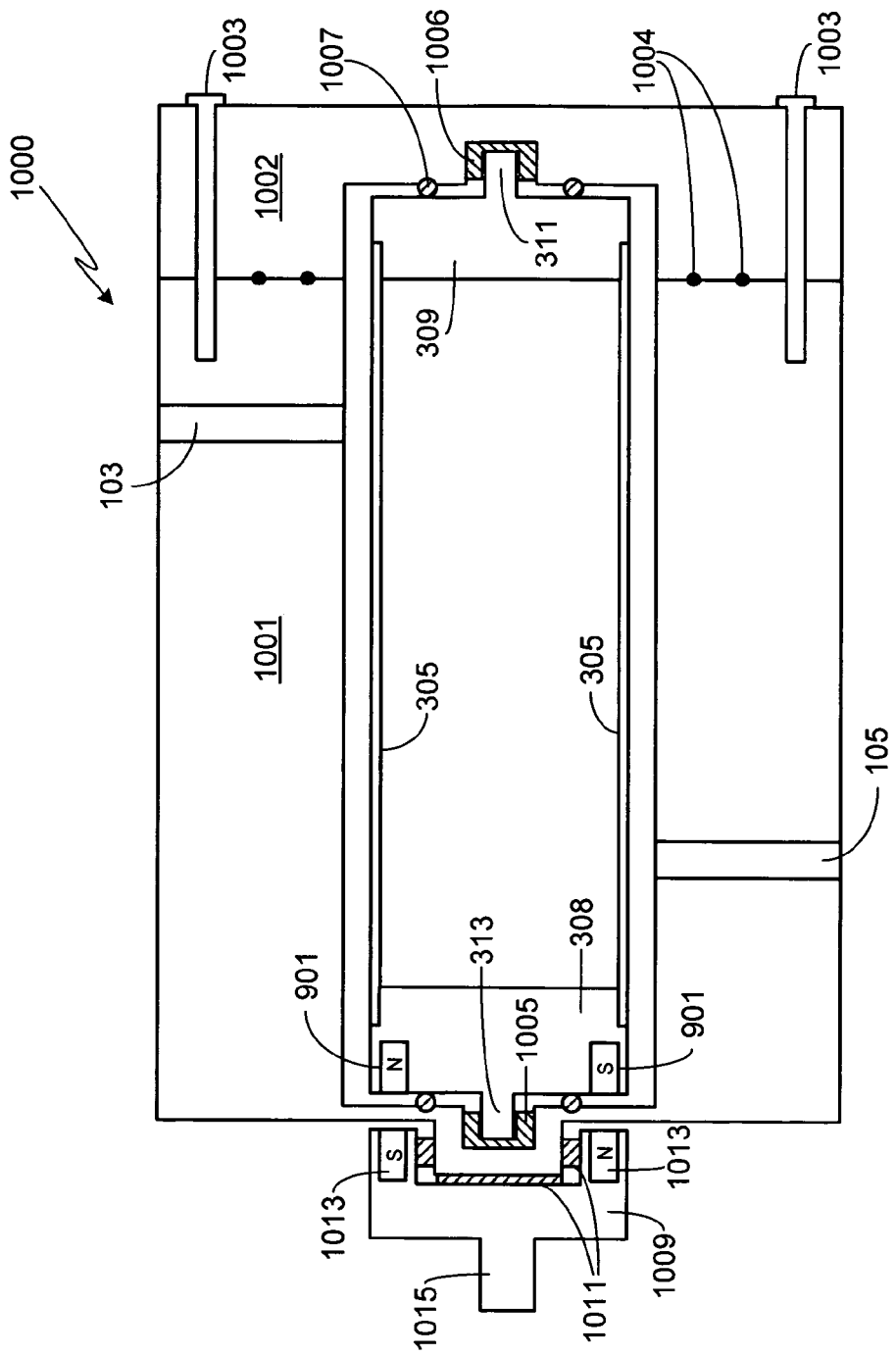
FIG. 10 is a cross-sectional view of a cavitation chamber utilizing the impeller shown in FIG. 9.

The embodiment shown in FIGS. 7-8 is only meant to illustrate one preferred method of magnetically coupling to the impeller of the invention. It will be appreciated that there are many methods which can be used to magnetically rotate the chamber's internal impeller. For example, FIGS. 9 and 10 illustrate an alternate embodiment in which permanent magnets 901 are embedded in the end surface of end cap 308 as shown. As a consequence of the location of magnets 901, the overall shape of chamber 1000 is different from that of the previous embodiment with chamber 1000 being comprised of sections 1001 and 1002. Although a variety of means can be used to couple the chamber sections together, as in the previous embodiment preferably the two sections are bolted together with a plurality of bolts 1003 and sealed with one or more sealing members 1004. Impeller 900 is held in place within chamber 1000, while still being free to rotate, using bearings and/or spacers 1005-1007.

As illustrated, the shape of the end portion of chamber section 1001 is such that the chamber wall adjacent to impeller magnets 901 is thin enough to allow an external magnetic field to interact with the magnetic field produced by magnets 901 while still being thick enough to handle peak pressures. A cup-shaped member 1009 is configured to rotate about the end portion of section 1001. Optionally one or more spacers 1011, for example Teflon spacers, are used to properly space and allow the rotation of member 1009. Embedded within member 1009 is a plurality of permanent magnets 1013 of alternating magnetic polarity, two such magnets being shown in the cross-sectional view of FIG. 10. A drive shaft 1015 provides a means of coupling member 1009 to a drive motor and associated controller (e.g., drive motor 301 and controller 303), not shown. Due to the magnetic field generated by magnets 1013 and its interaction with the magnetic field generated by magnets 901, rotation of member 1009 causes the rotation of impeller 900 within chamber 1000.

Figure 11:
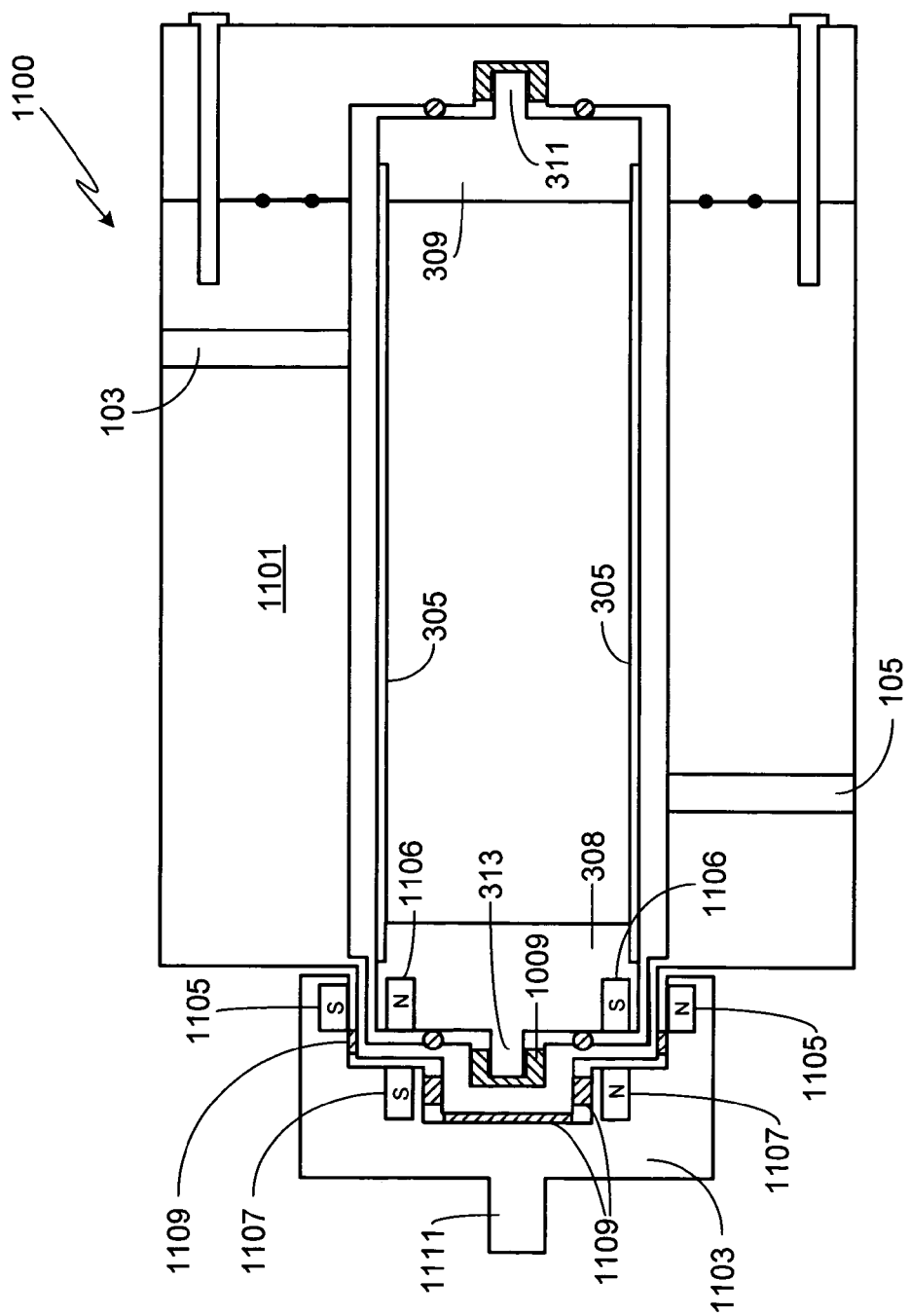
FIG. 11 is a cross-sectional view of an alternate cylindrical cavitation chamber utilizing a dual magnetic coupling system.

FIG. 11 is a cross-sectional view of an alternate embodiment configured to provide additional torque over the impeller. As shown, this embodiment combines magnetic coupling features of the previous two embodiments. In particular, chamber section 1101 is shaped to allow close proximity of cup-shaped member 1103 in two planes, thus allowing embedded magnets 1105 to interact with impeller magnets 1106 in one plane and embedded magnets 1107 in a second plane. As in the previous embodiments, a plurality of spacers 1109 insure proper spacing of member 1103 relative to chamber section 1101 while still permitting its free rotation. This embodiment allows a stronger magnetic field to be generated by magnetic coupler 1103 on the impeller. A drive shaft 1111 allows member 1103 to be coupled to a drive motor/controller (not shown).

It will be appreciated that the magnetic coupling systems illustrated in FIGS. 7-11 or those illustrated below can be duplicated on the opposite end of the impeller, thereby easily doubling the strength of the drive mechanism by providing magnetic coupling and impeller rotation on both impeller ends.

In addition to using any of a variety of magnetic coupling systems based on permanent magnets, it will be appreciated that the inventor also envisions countless variations utilizing electromagnetic coupling means. In such a system, the impeller assembly includes a rotor at one end of the impeller assembly, or rotors at both ends of the impeller assembly, the rotor(s) including either permanent magnets or material susceptible to a magnetic field (e.g., a ferromagnetic material). An electromagnetic stator, external to the chamber and surrounding the rotor(s), provides the force required to turn the rotor(s) and thus the impeller assembly.

FIGS. 12 and 13 provide end views of the rotors of exemplary impeller assemblies, rotor 1201 utilizing a ferromagnetic rotor and rotor 1301 utilizing a permanent magnet rotor. As shown, rotor 1201 includes 8 teeth 1203 while rotor 1301 includes 2 teeth 1303. It should be understood that the invention is not limited to specific rotor designs, rather rotors 1201 and 1301 are merely illustrative of the invention. In preferred embodiments of the invention, the rotors are embedded within a second material, thus eliminating the edges of the teeth. FIGS. 14 and 15 provide end views of two such embedded rotors. FIG. 14 shows a rotor assembly 1400 in which an 8 tooth ferromagnetic rotor 1401 (shown in phantom) is embedded within a non-ferromagnetic material 1403 (e.g., a ceramic). Similarly, FIG. 15 shows a rotor assembly 1500 in which a 2 tooth permanent magnet rotor 1501 (shown in phantom) is embedded within a non-ferromagnetic material 1503. By embedding the rotors within a cylindrically shaped second material, the rotor does not cause unwanted turbulence within the cavitation medium. Although the present invention is not limited to specific stator designs, an exemplary stator 1600 is shown in FIG. 16, stator 1600 having 12 stator poles divided into three stator pole sets 1601-1603.

Figure 17:
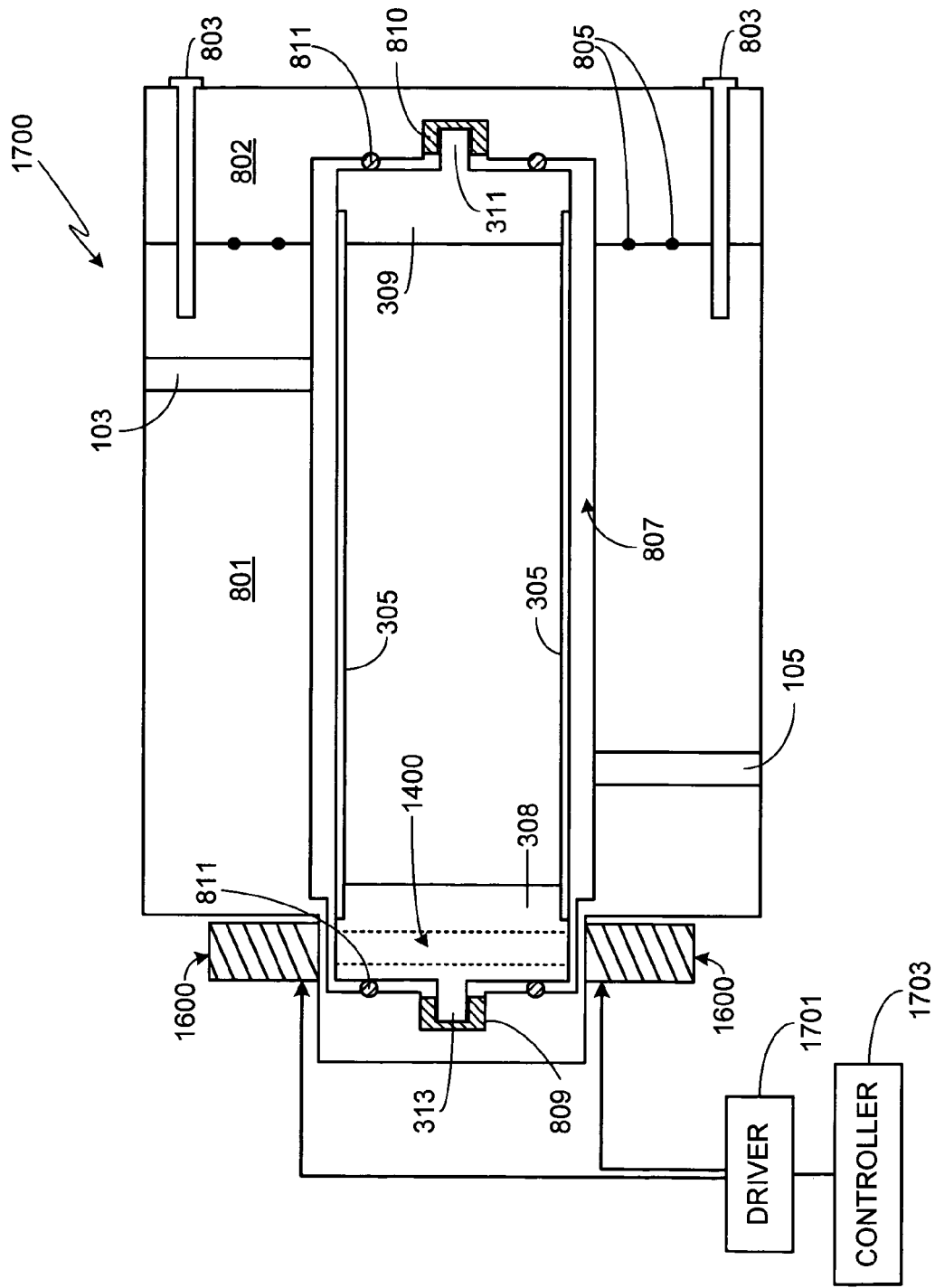
FIG. 17 is a cross-sectional view of another embodiment of the invention utilizing an electromagnetic coupling/drive system.

FIG. 17 is a cross-sectional view of a chamber 1700 which is similar to the configuration shown in FIG. 8. However the impeller assembly of chamber 1700 is driven with an electromagnetic assembly in which a rotor 1400 (shown in phantom) is embedded within impeller end-cap 308. As shown, the electromagnetic assembly includes a stator 1600 coupled to a motor driver 1701 and a controller 1703. It will be appreciated that this is simply one possible configuration of the invention utilizing an electromagnetic system for driving the impeller assembly.

The embodiments shown in FIGS. 3-17 are only meant to illustrate some of the various methods of mechanically, magnetically or electromagnetically coupling to and driving the impeller assembly of the invention. It will be appreciated that the invention is not limited to a particular impeller design/shape, chamber design/shape, impeller sealing means, impeller driving means, etc. Nor does the invention require that the shape of the impeller assembly match that of the cavitation chamber. Thus, for example, a cylindrical impeller can be used with a spherical or rectangular chamber.

Degassing System

Figure 18:
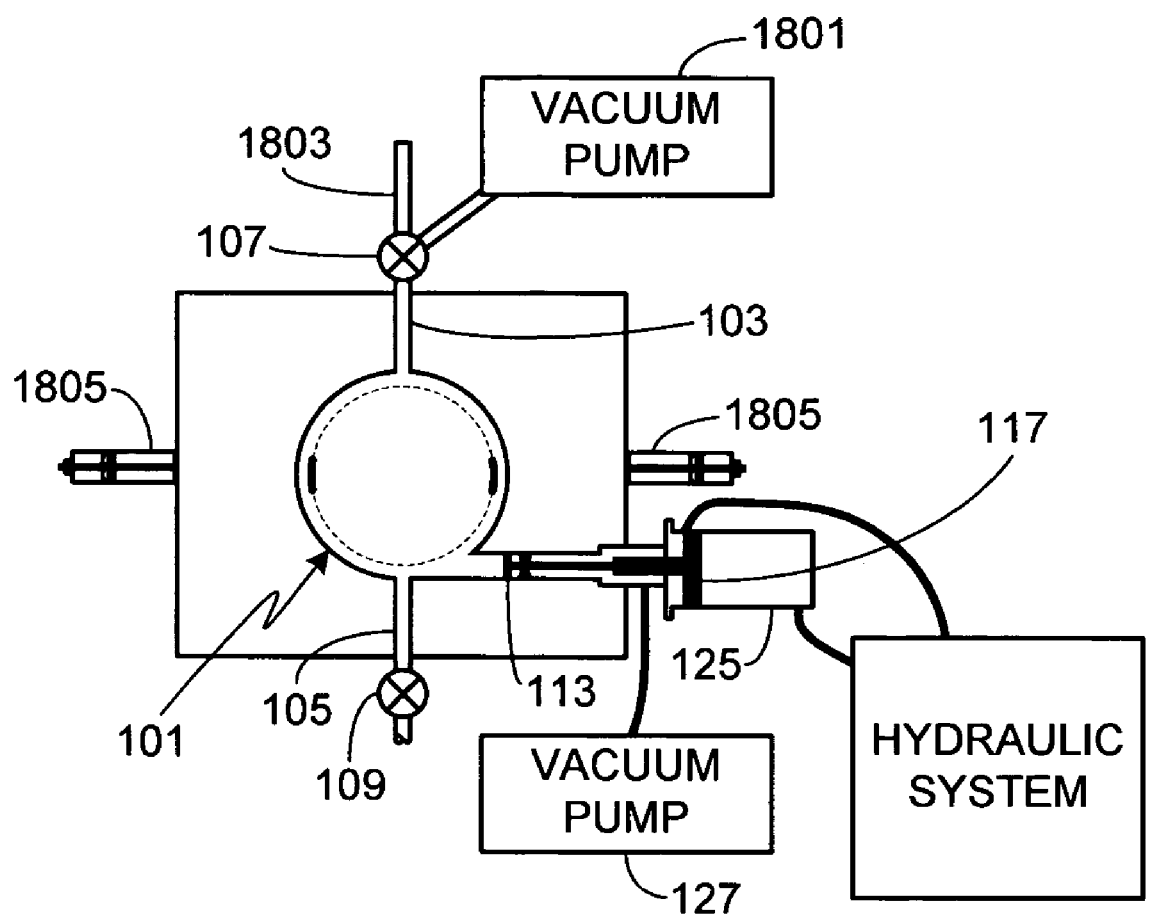
FIG. 18 is a cross-sectional view of an embodiment in which degassing is performed within the cavitation chamber.

As previously noted, degassing of the cavitation fluid can be performed within the cavitation chamber, within a separate degassing chamber, or degassed in stages such that the initial stages of degassing are performed prior to chamber filling and the final stages of degassing are performed within the cavitation chamber. FIG. 18 illustrates one embodiment of the invention in which degassing is performed within the cavitation chamber itself. FIG. 18, as well as FIG. 19 which follows, are based on the cavitation system shown in FIG. 1 although it will be understood that these degassing systems are not limited to the specific designs for the chamber, impeller assembly and/or hydraulic driver shown in FIG. 1. Additionally, for the sake of illustration simplicity, FIGS. 18-19 do not include all aspects of the driver and/or impeller assemblies as these aspects are described in detail elsewhere within this specification.

The first step in degassing the cavitation fluid within the chamber is to fill the chamber. The chamber can be filled via inlet 103, for example by first evacuating chamber 101, thus allowing the cavitation fluid to easily flow into the chamber. If chamber 101 is not first evacuated, the air exiting the chamber must either be allowed to pass through the entering fluid, or pass out through a separate inlet positioned near or at the uppermost portion of the chamber (not shown). Alternately the cavitation fluid can be pumped up through inlet 105, thus allowing the exiting air to pass out of inlet 103. Once filled, the cavitation fluid is degassed by vacuum pump 1801. Preferably pump 1801 is attached to chamber 101 via a three-way valve, e.g., valve 107, thus allowing the chamber to either be coupled to pump 1801 or open to the atmosphere via conduit 1803. Although pump 1801 can degas the cavitation fluid within chamber 101 to a sufficient degree for many applications, preferably additional degassing stages are implemented. A detailed description of the additional degassing stages are provided below. In general, the additional degassing requires that the cavitation fluid be cavitated, thus further reducing the concentration of air/vapor within the fluid. Although hydraulically actuated cavitation piston 113 can be used for this purpose, in at least one embodiment of the invention one or more acoustic drivers 1805 are coupled to chamber 101, drivers 1805 providing a convenient means of cavitating and degassing the fluid as described more fully below.

Figure 19:
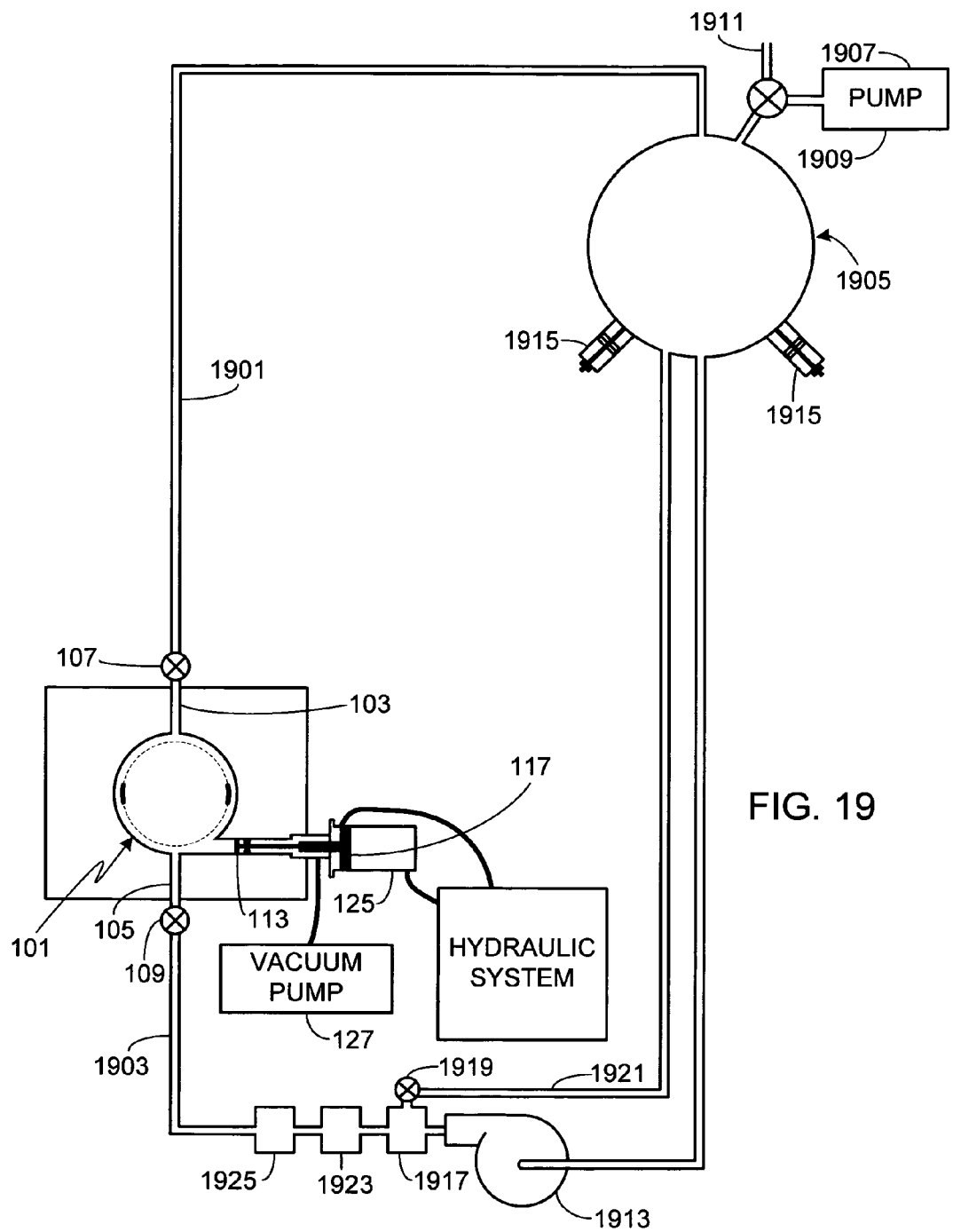
FIG. 19 is a cross-sectional view of an embodiment in which degassing is performed within a separate degassing chamber.

FIG. 19 illustrates an alternate degassing system. As shown, the hydraulically driven cavitation chamber 101 is coupled via lines 1901 and 1903 to a degassing chamber 1905. Preferably degassing chamber 1905 serves a dual purpose; both as a degassing chamber and a fluid reservoir. Chamber 1905 is coupled to a vacuum pump 1907 via a three-way valve 1909, valve 1909 allowing chamber 1905 to be coupled to pump 1907 (e.g., for degassing purposes) or open to the atmosphere via conduit 1911. Pump 1913 is used to pump the cavitation fluid from degassing chamber/reservoir 1905 into cavitation chamber 101.

In one approach, all cavitation fluid degassing is performed within chamber 1905. Once degassed, chamber 101 is filled with the cavitation fluid, preferably by simply pumping the fluid through line 1903 with pump 1913 into evacuated chamber 101. After it is filled, chamber 101 can be decoupled from the degassing system, for example with valves 107/109. In an alternate approach, the cavitation fluid can be degassed first within chamber 1905, and then degassed further within cavitation chamber 101. Preferably chamber 101 is decoupled from degassing chamber 1905 prior to performing further degassing within chamber 101. In yet another alternate approach, after the initial degassing procedure has been completed and cavitation chamber 101 is operable, the cavitation fluid is periodically pumped through the system and degassed within chamber 1905. One benefit of this approach is the removal of gases that have been generated as a by-product of reactions taking place within chamber 101.

Although degassing with vacuum pump 1907 attached to chamber/reservoir 1905 is sufficient for many applications, as previously noted relative to the system shown in FIG. 18, further degassing via cavitation is preferred. In one preferred embodiment cavitation degassing is performed within chamber 1905 by attaching one or more drivers 1915 (e.g., acoustic drivers) to chamber 1905 as shown. In an alternate preferred embodiment, after completion of the initial stage of degassing within chamber 1905, cavitation degassing is performed within chamber 101, either using the hydraulically actuated cavitation piston 113 or additional drivers (e.g., acoustic drivers) attached to chamber 101, for example as shown in FIG. 18 (i.e., drivers 1805).

If the cavitation fluid is degassed in a separate chamber and then pumped into the cavitation chamber as in the embodiment illustrated in FIG. 19, preferably the system also includes a bubble trap 1917 that immediately follows the outlet of pump 1913 as shown, thus helping to eliminate any bubbles generated by the pump itself. Preferably bubble trap 1917 is coupled to chamber 1905 via valve 1919 and conduit 1921. During use, bubbles that are trapped float to the top portion of trap 1917 where they are periodically removed via valve 1919 and conduit 1921, conduit 1921 being indirectly coupled to vacuum pump 1907. One suitable configuration for bubble trap 1917 is shown in co-pending U.S. patent application Ser. No. 11/002,448, filed Dec. 1, 2004, the entire disclosure of which is incorporated herein for any and all purposes.

If a separate degassing chamber and/or circulatory system is used, preferably a filter 1923 is included, the filter preceding the chamber inlet port into which the cavitation fluid is pumped (e.g., inlet 105). Filter 1923 is used to remove contaminants from the cavitation fluid that could potentially disrupt the cavitation process. The contaminants may be native to the cavitation fluid. Alternately, or in addition to native contaminants, the contaminants to be removed may be a product of the cavitation process itself, for example resulting from the flow of the cavitation fluid through a heat exchange system or from the effects of the cavitation process on the internal surfaces of the cavitation chamber. Alternately, or in addition to the above-described contaminants, the contaminants may be a by-product of a reaction taking place within the cavitation chamber. It will be appreciated that the exact nature of filter 1923 depends upon the type of cavitation fluid as well as the type and size of contamination, i.e., impurity, to be removed from the cavitation fluid. As filters are well know, further description is not provided herein.

In at least one of the preferred embodiments in which an external degassing and/or circulatory system is used, a heat exchange system 1925 is coupled to the system, thus allowing the temperature of the cavitation fluid to be controlled. The cavitation fluid can be continually pumped through heat exchange system 1925 during chamber operation, or used to alter the temperature of the fluid prior to chamber operation, or used to periodically alter the temperature of the fluid. Furthermore heat exchange system 1925 can be used to cool the cavitation fluid below ambient temperature, to cool the cavitation fluid by removing excess heat from the cavitation chamber, or to heat the cavitation fluid to a desired temperature.

In a preferred embodiment heat exchange system 1925 is used to cool the cavitation fluid below ambient temperature, thus lowering the vapor pressure of the fluid and allowing higher velocities to be achieved by the collapsing bubbles within chamber 101. As a result, the cavitating bubbles generate higher temperatures at collapse stagnation. Although in this embodiment heat exchange system 1925 is typically located after pump 1913 and as close to cavitation chamber 101 as reasonable, thus minimizing the introduction of heat into the cooled cavitation medium from pump 1913, the surroundings, etc., it will be appreciated that the location of system 1925 relative to pump 1913 depends on the ambient temperature, the temperature to which the cavitation fluid is to be maintained, and the preferred operating temperature of the pump.

In another embodiment heat exchange system 1925 cools the cavitation fluid by withdrawing excess heat generated within the chamber. The excess heat can be a product of the cavitation process itself as the cavitating bubbles generate heat within the fluid, for example due to viscous effects. The excess heat can also be the product of reactions taking place within the chamber which are promoted by the cavitation process. Such reactions include both chemical reactions and nuclear reactions. The excess heat can also be the result of heat conducted into the cavitation medium from cavitation piston 113. In embodiments in which the cavitation fluid is a hot liquid such as a molten metal or salt, heat exchange system 1925 is preferably located before pump 1913 rather than after pump 1913 as shown in FIG. 19. Such a mounting location is preferred as it cools the cavitation fluid before introducing it into pump 1913, thus minimizing the pump operating temperature for such applications. It will be appreciated that whether heat exchange system 1925 is located before or after pump 1913 depends upon the temperatures of the cavitation fluid before and after heat exchange system 1925, the ambient temperature and the preferred operating temperatures of pump 1913 and the cavitation fluid.

In another embodiment heat exchange system 1925 is used to heat the cavitation fluid to the desired operational temperature. Such heating is useful, for example, to promote specific reactions (e.g., chemical reactions) within the cavitation fluid or to maintain the cavitating medium in the fluid phase (i.e., heating to above the melting temperature of the medium). Preferably heat exchange system 1925 is positioned relative to pump 1913 as shown, thus allowing pump 1913 to pump a relatively cool fluid. As previously noted, the location of heat exchange system 1925 relative to pump 1913 depends upon the temperatures of the cavitation fluid before and after heat exchange system 1925, ambient temperature and the preferred operating temperatures of pump 1913 and the cavitation fluid.

Detailed descriptions of the implementation of a heat exchange system 1925 with a cavitation fluid circulatory system are provided in co-pending U.S. patent application Ser. No. 10/961,353, filed Oct. 7, 2004, the entire disclosure of which is incorporated herein for any and all purposes. With respect to the actual heat exchange system, such systems are well known by those of skill in the art and therefore detailed descriptions are not provided herein.

If sufficient heat is withdrawn from the cavitating liquid by heat exchange system 1925, the excess heat can be used to drive any of a variety of thermally powered systems such as heaters, thermoelectric generators and steam turbines (not shown), thus producing electricity that can be used for a variety of applications, including reduction of the electrical demands of the cavitation system itself.

If a separate degassing chamber is used and coupled to the primary cavitation chamber via a circulatory system as shown in FIG. 19, preferably the circulatory system provides a simple means of either circulating the fluid or draining the cavitation chamber (i.e., chamber 101). A benefit of such a system is that it allows chamber 101 to be drained without draining the circulatory system, thus minimizing cavitation fluid loss, exposure to the atmosphere and possible contamination. Methods of implementing a circulatory system with cavitation chamber 101 are provided in co-pending U.S. patent application Ser. No. 11/001,720, filed Dec. 1, 2004, the entire disclosure of which is incorporated herein for any and all purposes.

Cavitation Fluid Preparation

In order to achieve high intensity cavity implosions, the cavitation medium must first be degassed. It should be understood that the present invention is not limited to a particular degassing technique, and the techniques described herein are for illustrative purposes only.

The first step in the degassing method is to fill the degassing chamber with cavitation fluid. As previously described, the degassing chamber can either be the actual cavitation chamber 101 or a separate degassing chamber (e.g., chamber 1905) which is either coupled or non-coupled to cavitation chamber 101. Once the chamber is filled, the cavitation fluid is degassed with a vacuum pump (e.g., pump 1805 with the cavitation chamber or pump 1907 with separate degassing chamber 1905). The amount of time required during this step depends on the volume of cavitation fluid to be degassed and the capabilities of the vacuum system. Preferably the vacuum pump evacuates the chamber in which the cavitation fluid resides until the pressure within the chamber is close to the vapor pressure of the cavitation fluid, for example to a pressure of within 0.2 psi of the vapor pressure of the cavitation fluid or more preferably to a pressure of within 0.02 psi of the vapor pressure of the cavitation fluid. Typically this step of the degassing procedure is performed for at least 1 hour, preferably for at least 2 hours, more preferably for at least 4 hours, and still more preferably until the reservoir pressure is as close to the vapor pressure of the cavitation fluid as previously noted.

Once the fluid within the chamber is sufficiently degassed using the vacuum pump, preferably further degassing is performed by cavitating the fluid, the cavitation process tearing vacuum cavities within the cavitation fluid. As the newly formed cavities expand, gas from the fluid that remains after the initial degassing step enters into the cavities. During cavity collapse, however, not all of the gas re-enters the fluid. Accordingly a result of the cavitation process is the removal of dissolved gas from the cavitation fluid via rectified diffusion and the generation of bubbles.

As previously described, cavitation as a means of degassing the fluid can be performed within cavitation chamber 101 or separate degassing chamber 1905. Furthermore, any of a variety of techniques can be used to cavitate the fluid. Although cavitation piston 113 can be used during degassing, in the preferred embodiment of the invention one or more acoustic drivers (e.g., drivers 1805 or 1915) are coupled to the degassing chamber. Acoustic drivers can be fabricated and mounted, for example, in accordance with co-pending U.S. patent application Ser. No. 10/931,918, filed Sep. 1, 2004, the entire disclosure of which is incorporated herein for any and all purposes. Assuming acoustic drivers are used, the operating frequency of the drivers depends on a variety of factors such as the sound speed of the liquid within the chamber, the shape/geometry of the chamber, the sound field geometry of the drivers, etc. In at least one embodiment the operating frequency is within the range of 1 kHz to 10 MHz. The selected frequency can be the resonant frequency of the chamber, an integer multiple of the resonant frequency, a non-integer multiple of the resonant frequency, or periodically altered during operation.

For high vapor pressure liquids, preferably prior to the above-identified cavitation step the use of the vacuum pump (e.g., pump 1801 or pump 1907) is temporarily discontinued. Next the fluid within the chamber (e.g., chamber 101 or chamber 1905) is cavitated for a period of time, typically for at least 5 minutes and preferably for more than 30 minutes. The bubbles created during this step float to the top of chamber due to their buoyancy. The gas removed from the fluid during this step is periodically removed from the system, as desired, for example using vacuum pump 1801 if the chamber used for this degassing step is chamber 101, or using vacuum pump 1907 if the chamber used for this degassing step is chamber 1905. Typically the vacuum pump is only used after there has been a noticeable increase in pressure within the degassing chamber, preferably an increase of at least 0.2 psi over the vapor pressure of the cavitation fluid, alternately an increase of at least 0.02 psi over the vapor pressure of the cavitation fluid, or alternately an increase of a couple of percent of the vapor pressure. If acoustic drivers are used, preferably the use of cavitation as a means of degassing the cavitation fluid is continued until the amount of dissolved gas within the cavitation fluid is so low that the fluid will no longer cavitate at the same cavitation driver power. If a hydraulic piston driver(s) is used, preferably either the cavitation/degassing steps are performed for a predetermined period of time (e.g., at least 12 hours, preferably for at least 24 hours, more preferably for at least 36 hours, etc.) or until the pressure within the chamber remains stable at the vapor pressure of the cavitation fluid for a predetermined period of time (e.g., at least 10 minutes, greater than 30 minutes, preferably greater than an hour, etc.).

The above degassing procedure is sufficient for most applications, however in an alternate embodiment of the invention another stage of degassing is performed prior to cavitating the fluid using the hydraulic actuated driver. The first step of this additional degassing stage is to form cavities within the cavitation fluid contained in the degassing chamber. These cavities can be formed using any of a variety of means, including neutron bombardment, focusing a laser beam into the cavitation fluid to vaporize small amounts of fluid, by locally heating small regions with a hot wire, or by other means. Once one or more cavities are formed within the cavitation fluid, acoustic drivers 1805 or 1915, or cavitation piston 113, cause the cavitation of the newly formed cavities, resulting in the removal of additional dissolved gas within the fluid and the formation of bubbles. The bubbles, due to their buoyancy, drift to the top of the chamber where the gas can be removed, when desired, using a vacuum pump (e.g., pump 1801 or pump 1907). This stage of degassing can continue for either a preset time period (e.g., greater than 6 hours and preferably greater than 12 hours), or until the amount of dissolved gas being removed is negligible as evidenced by the pressure within the chamber remaining stable at the vapor pressure of the cavitation fluid for a preset time period (e.g., greater than 10 minutes, or greater than 30 minutes, or greater than 1 hour, etc.).

Hydraulic Driver Methodology

In a preferred approach, prior to cavitation and after the cavitation fluid has been degassed as previously noted, and after the cavitation chamber 101 has been filled with the degassed cavitation fluid (assuming that degassing was performed in a separate degassing chamber), hydraulic piston 117 and coupled cavitation piston 113 are partially withdrawn from the completely extended position. The amount of piston withdrawal depends, in part, on the compressibility of the cavitation medium. For example, a cavitation fluid comprised of a very non-compressible liquid (e.g., a liquid metal such as mercury) typically requires much less pre-cavitation piston withdrawal than a more compressible liquid (e.g., acetone). For a compressible liquid such as acetone, a pre-cavitation piston withdrawal of approximately 25 percent is preferred. During this step the chamber can be left open to the degassing and/or circulatory system, thus allowing it to automatically fill during piston partial withdrawal. Alternatively, the chamber can be filled-up after completion of the step of partially withdrawing the piston, thus compensating for the fluid withdrawn during piston withdrawal.

The next step is to isolate the cavitation chamber from any degassing systems and/or a cavitation fluid circulatory systems to which it is coupled, for example using valves 107/109. Chamber isolation prior to operation is required to insure that the desired operating pressures can be reached.

After chamber isolation, hydraulic piston 117 and coupled cavitation piston 113 are withdrawn, causing a cavity (e.g., a bubble) to be formed within the degassed cavitation fluid. The hydraulic piston 117 and coupled cavitation piston 113 are then rapidly extended to the fullest possible extent as limited either by mechanical piston stops or by the resultant back pressure. During piston extension, the previously created cavity or cavities are compressed, causing cavity implosion. Subsequent cavitation cycles only require cycling cavitation piston 113, i.e., it is unnecessary to open the chamber, partially withdraw the piston, isolate the chamber and cycle the piston. Although the system can be used for single cavitation cycles, preferably multiple cycles are performed, thus generating high chamber pressures and extremely energetic implosions. The maximum cycle rate depends on the speed of the solenoid valves, the compressibility of the cavitation fluid, the pressure applied by the cavitation piston, the size of the chamber, the number of hydraulic lines coupling valves 131 to cylinder 125 and the size and pressure of accumulator 137. In the preferred embodiment, pistons 117/113 are fully extended at a rate of approximately 0.1 seconds per stroke. The system can be cycled, i.e., piston retracted and then extended, at a rate of up to 20 cycles per second.

In an alternate preferred approach, prior to cavitation and after the cavitation fluid has been degassed and the cavitation chamber 101 filled (assuming the use of a separate degassing chamber), hydraulic piston 117 and coupled cavitation piston 113 are completely withdrawn. During this step the cavitation chamber can either be open to, or isolated from, any coupled degassing and/or cavitation fluid circulatory systems. After pistons 117/113 are completely withdrawn, the cavitation chamber inlets (e.g., inlets 103/105 controlled via valves 107/109) are opened if previously closed, or left open if previously open.

The next step is to isolate the cavitation chamber from any coupled degassing and/or cavitation fluid circulatory systems, for example by closing any inlet valves (e.g., valves 107/109). Once the chamber is isolated, hydraulic piston 117 and coupled cavitation piston 113 are extended to the fullest extent possible as limited either by mechanical piston stops or by the resultant back pressure. As a result of the extension of pistons 117/113, the cavitation fluid is compressed and the internal pressure of the cavitation chamber is increased.

It will be appreciated that the amount that pistons 117/113 can be extended depends, in part, on both the compressibility of the cavitation fluid and the ratio of the areas of pistons 117 and 113. Thus, for example, if the fluid is extremely uncompressible, such as mercury or another liquid metal, during this step the pistons would not be able to be extended very far prior to the back pressure stopping further piston travel. In such situations the chamber can be opened slightly during the initial fluid compression step, thus allowing the pistons to travel further than would otherwise be allowed. If this approach is taken, the chamber is closed (i.e., isolated) prior to the pistons becoming fully extended (for example, after the pistons have traveled between 75 and 90 percent of their full range).

After chamber isolation and cavitation fluid compression, the cavitation chamber is partially opened, for example to the degassing system and/or cavitation fluid circulatory system to which it is coupled. Preferably this step is performed by opening a valve located near the top of cavitation chamber 101, and more preferably at the uppermost portion of the cavitation chamber (e.g., valve 107). The valve is only opened by a small degree and for a short period of time; just sufficient to allow the internal cavitation chamber pressure to drop to a predetermined level or to change by a predetermined amount. The amount that the pressure is allowed to change governs the size of the cavity that will be cavitated during the cavitation process, i.e., greater pressure changes result in larger cavities. It will be appreciated that the invention does not require a specific cavity size, rather the size to be cavitated is dictated by the type of desired reaction and thus the intended reactants and the desired temperature and pressure. Other factors which determine the desired pressure change include cavitation fluid compressibility, cavitation chamber size, hydraulic driver capabilities, cavitation piston effective area, and the degree to which the cavitation fluid has been degassed during the prior degassing steps.

Once the pressure has been allowed to change by the predetermined amount, the cavitation chamber is once again isolated, for example from any degassing and/or cavitation fluid circulatory systems if such are employed. After chamber isolation, hydraulic piston 117 and coupled cavitation piston 113 are withdrawn, causing a cavity (e.g., a bubble) to be formed within the degassed cavitation fluid. The hydraulic piston 117 and coupled cavitation piston 113 are then rapidly extended to the fullest possible extent as limited either by mechanical piston stops or by the resultant back pressure. During piston extension, the previously created cavity or cavities are compressed, causing cavity implosion. Subsequent cavitation cycles only require cycling cavitation piston 113, i.e., it is unnecessary to open/close the cavitation chamber and adjust the internal chamber pressure. As in the previous method, the system can be used either for single cavitation cycles or multiple cavitation cycles, the maximum cycle rate depending on the speed of the solenoid valves, the compressibility of the cavitation fluid, the pressure applied by the cavitation piston, the size of the chamber, the number of hydraulic lines coupling valves 131 to cylinder 125 and the size of accumulator 137.

Alternate Configurations

Figure 20:
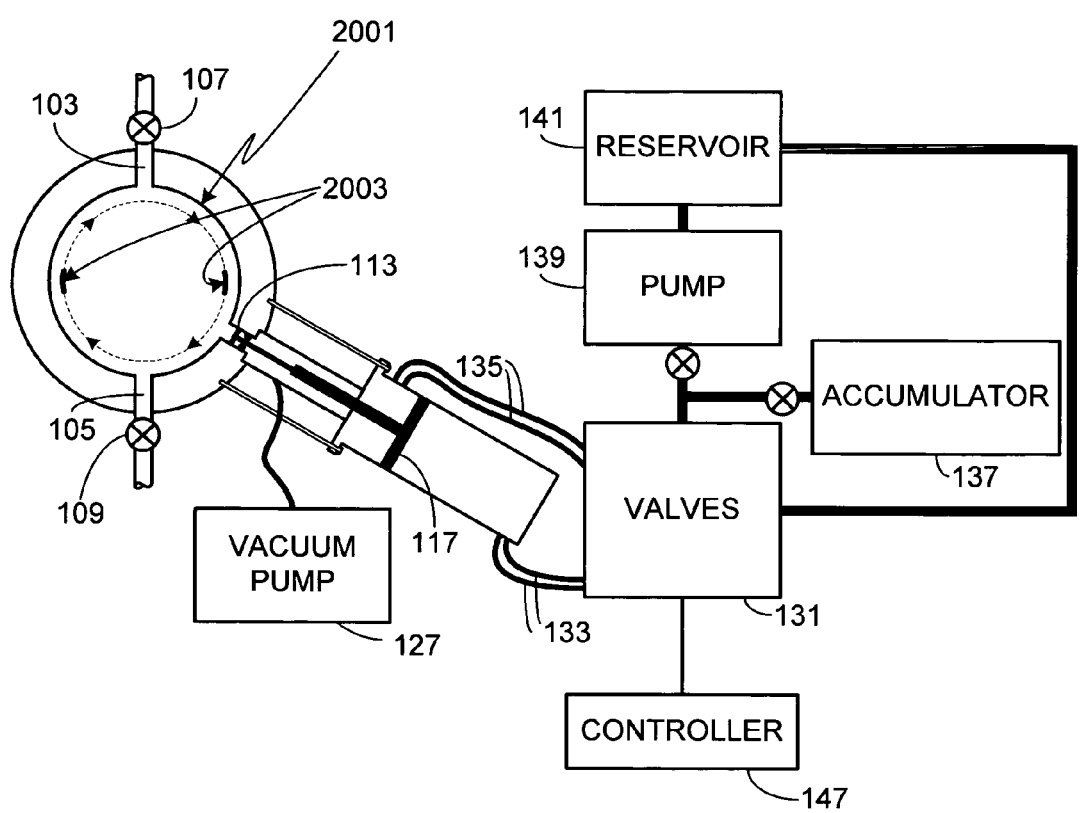
FIG. 20 is a cross-sectional view of a spherical cavitation chamber for use with the invention.
Figure 21:
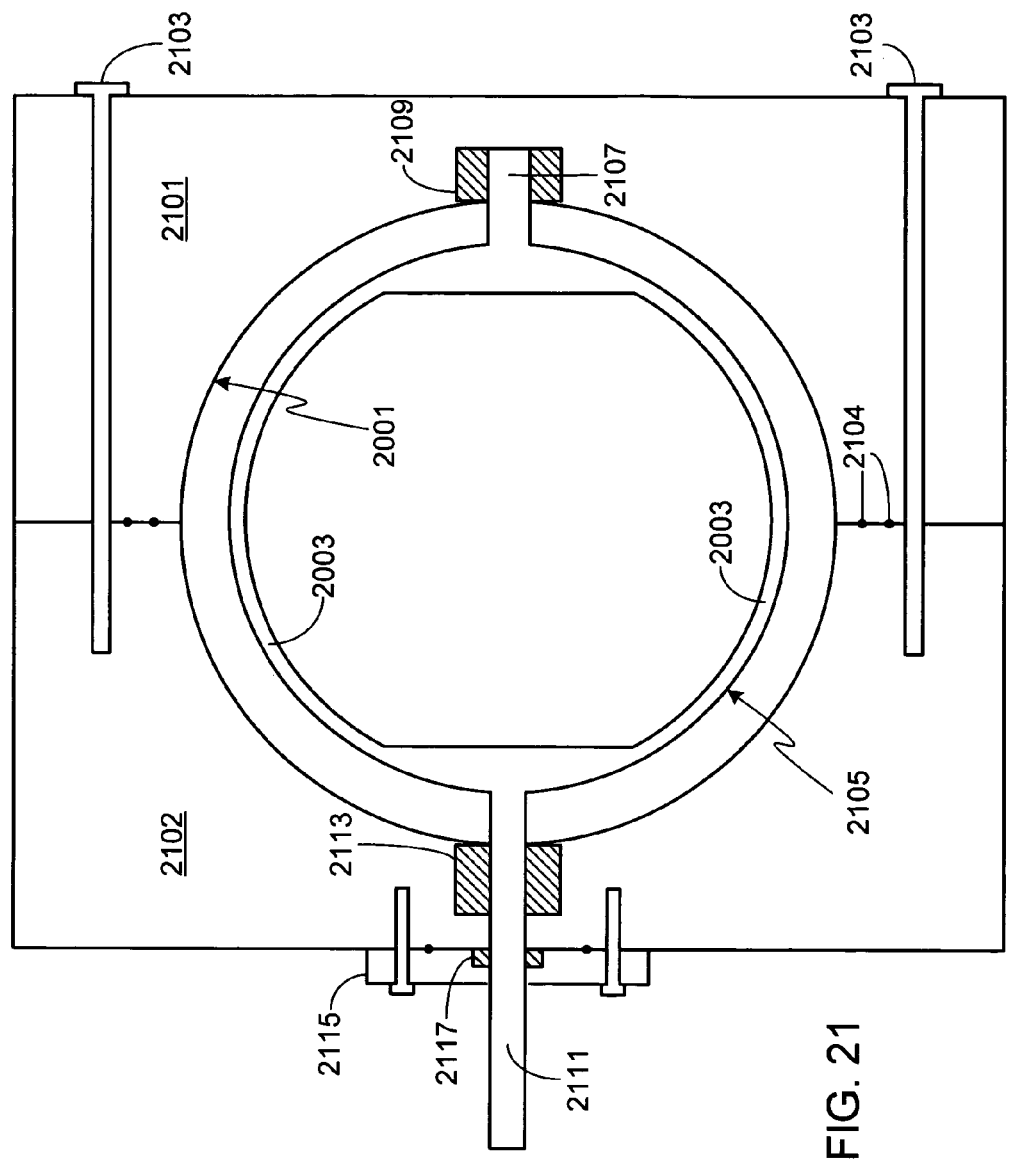
FIG. 21 is a cross-sectional view of a mechanically coupleable impeller assembly and the spherical cavitation chamber of FIG. 20.
Figure 22:
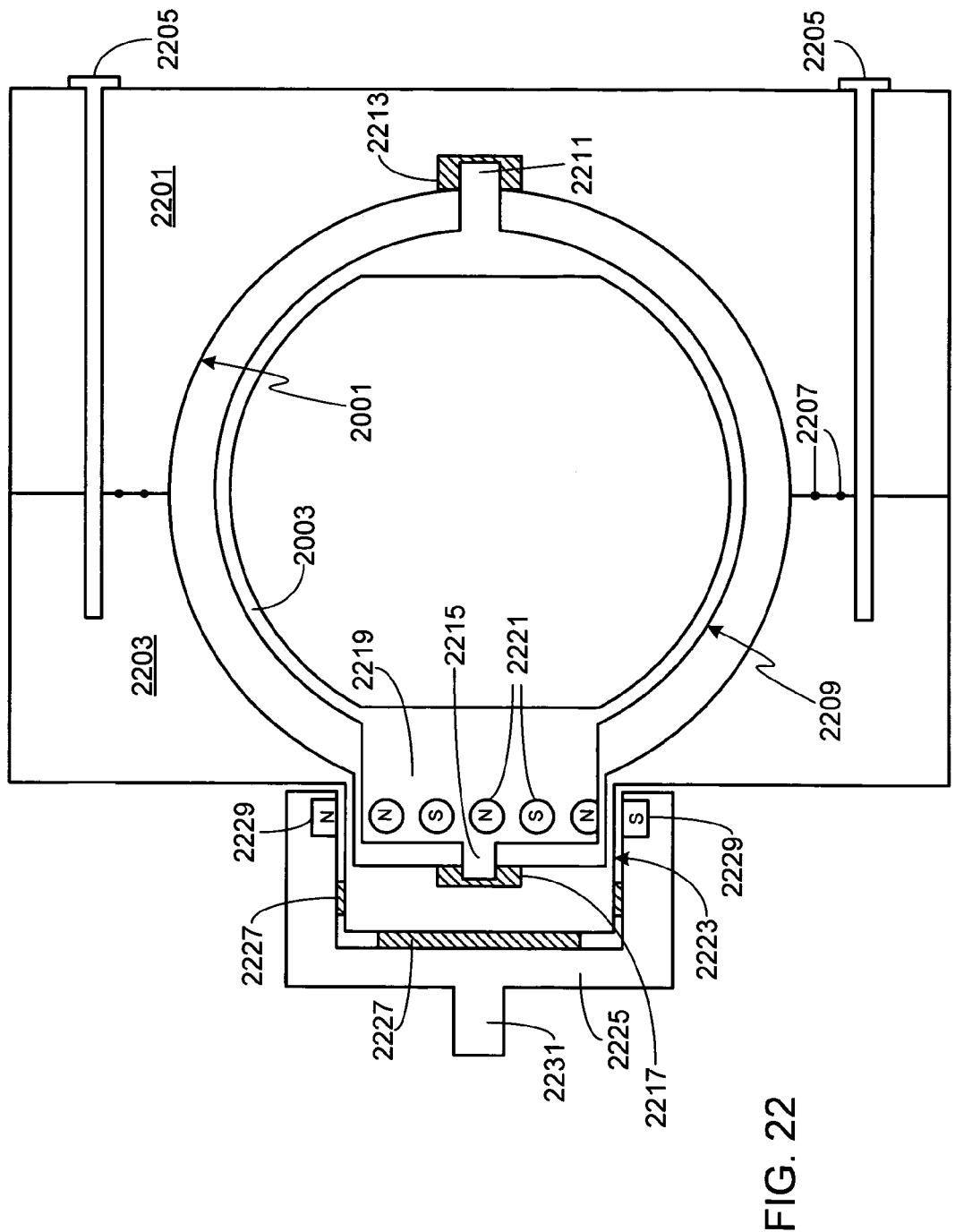
FIG. 22 is a cross-sectional view of a magnetically coupleable impeller assembly and the spherical cavitation chamber of FIG. 20.

As previously noted, the invention is not limited to cylindrical cavitation chambers such as the one shown in FIG. 1. For example, FIGS. 20-22 illustrate an embodiment of the invention utilizing a spherical cavitation chamber 2001, FIG. 20 showing a cross-sectional view of a chamber 2001 and a pair of impeller blades 2003. The degassing aspects as well as the hydraulic cavitation driver are the same as previously described relative to chamber 101. Spherical chamber 2001 can be fabricated as described in co-pending U.S. patent application Ser. No. 10/925,070, filed Aug. 23, 2004, the entire disclosure of which is incorporated herein for any and all purposes. Alternately, spherical chamber 2001 can be fabricated from multiple portions bolted together, or otherwise joined, and sealed with one or more seals (e.g., o-rings, gaskets, etc.) as shown in FIGS. 21 and 22. Operation of chamber 2001 is the same as described relative to chamber 101.

FIG. 21 is a cross-sectional view of chamber 2001 fabricated from chamber portions 2101 and 2102. For the sake of illustration simplicity, neither FIG. 21 nor FIG. 22 include those aspects of the invention that correspond to the cavitation piston and associated hydraulic driver system. Nor do FIGS. 21 and 22 include any degassing and/or circulatory system hardware (e.g., inlets, valves, vacuum pumps, etc.). In this embodiment, chamber portions 2101/2102 are bolted together with a plurality of bolts 2103 to form the chamber. At least one sealing member 2104 (e.g., o-ring, gasket, etc.) seals portion 2101 to portion 2102. Prior to assembling portions 2101/2102, impeller 2105 (which includes impeller blades 2003) is located within the spherical cavity of chamber 2001 such that spindle 2107 is fitted within bearing 2109. Spindle drive shaft 2111 is fitted through a seal/bearing housing 2113 incorporated within chamber portion 2102. Preferably an end cap 2115 is bolted to chamber portion 2102, end cap 2115 including an additional sealing member 2117. As previously noted, preferably the chamber includes a pair of chamber inlets (not shown), thus allowing the chamber to be filled, drained and/or coupled to a cavitation fluid circulatory and/or degassing system. As previously noted, impeller 2105 preferably includes at least 2 blades 2003. In use, drive shaft 2111 is coupled to a motor (e.g., motor 301) and a controller (e.g., controller 303) as previously described relative to the mechanically coupled cylindrical impeller shown in FIGS. 3, 4 and 6.

FIG. 22 is a cross-sectional view of an embodiment of the invention used with spherical chamber 2001 and magnetically coupled to the impeller drive system. In this embodiment, as in the mechanically coupled impeller embodiment shown in FIG. 21, the cavitation chamber is comprised of two sections 2201 and 2203. Although a variety of means can be used to join together and seal chamber sections 2201 and 2203, the preferred approach is with a plurality of bolts 2205 and one or more sealing members 2207 (e.g., o-ring, gasket, etc.). Prior to assembling portions 2201 and 2203, impeller 2209 is located within the spherical cavity of chamber 2001 such that spindle 2211 is fitted within bearing 2213 and spindle 2215 is fitted within bearing 2217. In one embodiment, bearings 2213 and 2217 are fabricated from a material with a low coefficient of friction, such as Teflon.

In the illustrated embodiment, embedded within cylindrically-shaped end portion 2219 of impeller 2209 is a plurality of permanent magnets 2221 of alternating magnetic polarity. The outer surface of end portion 2223 of chamber section 2203 is cylindrically shaped and is configured such that the chamber wall adjacent to the section of portion 2219 containing the embedded magnets 2221 is relatively thin. A cup-shaped member 2225 is configured to rotate about end portion 2223. Preferably one or more spacers 2227, for example Teflon spacers, are used to insure the smooth rotation of member 2225. Embedded within an internal surface of member 2225 adjacent to magnets 2221, is a plurality of permanent magnets 2229 of alternating magnetic polarity. A drive shaft 2231 of member 2225 is coupled to a drive motor and controller (not shown). Due to the magnetic field generated by magnets 2229 and its interaction with the magnetic field generated by magnets 2221, rotation of member 2225 causes the rotation of impeller 2209 within chamber 2001. As previously noted, preferably the chamber includes a pair of chamber inlets (not shown), thus allowing the chamber to be filled, drained and/or coupled to a cavitation fluid circulatory system. Preferably impeller 2009 uses at least two blades 2003.

It will be appreciated that any of the previously described magnetic coupling/drive systems can also be used with either a spherical chamber such as that shown in FIG. 20, or with other shaped cavitation chambers. Such magnetic coupling/drive systems can utilize permanent magnets, electromagnets or a combination of the two.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of initiating cavitation within a cavitation fluid within a cavitation chamber, the method comprising the steps of:
   retracting a cavitation piston coupled to a hydraulic driver and coupled to the cavitation chamber, wherein said cavitation piston is retracted from a fully extended position to a first partially withdrawn position;
   isolating the cavitation chamber;
   rotating at least one impeller located within the cavitation chamber, wherein cavitation fluid within the cavitation chamber rotates in response to said impeller rotating step;
   retracting said cavitation piston from said first partially withdrawn position to a second withdrawn position, wherein said second withdrawn position is further withdrawn than said first partially withdrawn position, and wherein at least one cavity is formed within the cavitation fluid within the cavitation chamber as a result of said step of retracting said cavitation piston to said second withdrawn position; and
   extending the cavitation piston from the second withdrawn position, wherein said extending step is performed until at least one cavity is imploded as a result of said extending step.

2. The method of claim 1, wherein said rotating step further comprises the step of mechanically coupling a motor to said at least one impeller, wherein said motor performs said rotating step.

3. The method of claim 2, wherein said mechanically coupling step further comprises the step of externally mounting said motor relative to said cavitation chamber.

4. The method of claim 1, wherein said step of rotating said at least one impeller located within the cavitation chamber is terminated prior to initiating said step of retracting said cavitation piston from said first partially withdrawn position to said second withdrawn position.

5. The method of claim 1, wherein said step of rotating said at least one impeller located within the cavitation chamber is terminated prior to initiating said cavitation piston extending step.

6. The method of claim 1, wherein said step of rotating said at least one impeller located within the cavitation chamber is initiated after completion of said step of retracting said cavitation piston from said first partially withdrawn position to said second withdrawn position.

7. The method of claim 6, wherein said step of rotating said at least one impeller located within the cavitation chamber is terminated prior to initiating said cavitation piston extending step.

8. The method of claim 1, further comprising the step of positioning an axis of rotation corresponding to said at least one impeller within a horizontal plane, said positioning step performed prior to said rotating step.

9. The method of claim 1, wherein said step of rotating said at least one impeller located within the cavitation chamber is performed continuously throughout said retracting and extending steps.

10. The method of claim 1, further comprising the steps of:
    terminating said rotating step; and
    positioning said at least one impeller in a first position after said terminating step and prior to initiating said step of retracting said cavitation piston from said first partially withdrawn position to said second withdrawn position.

11. The method of claim 10, further comprising the step of determining said first position on the basis of minimizing interference between said at least one impeller and said cavitation piston.

12. The method of claim 10, further comprising the step of determining said first position on the basis of maximizing distance between said at least one impeller and said cavitation piston.

13. The method of claim 1, further comprising the steps of:
terminating said rotating step; and
positioning said at least one impeller in a first position after said terminating step and prior to initiating said cavitation piston extending step.

14. The method of claim 13, further comprising the step of determining said first position on the basis of minimizing interference between said at least one impeller and said cavitation piston.

15. The method of claim 13, further comprising the step of determining said first position on the basis of maximizing distance between said at least one impeller and said cavitation piston.

16. The method of claim 13, wherein said step of rotating said at least one impeller located within the cavitation chamber is initiated after said step of retracting said cavitation piston from said first partially withdrawn position to said second withdrawn position.

17. The method of claim 1, further comprising the step of degassing the cavitation fluid prior to said first cavitation piston retracting step.

18. The method of claim 17, wherein said degassing step is performed within the cavitation chamber.

19. The method of claim 18, said degassing step further comprising the step of evacuating the cavitation chamber containing the cavitation fluid.

20. The method of claim 18, said degassing step further comprising the steps of cavitating the cavitation fluid within the cavitation chamber to remove gas from the cavitation fluid, and periodically evacuating the cavitation chamber to remove the gas generated by the step of cavitating the cavitation fluid to remove gas from the cavitation fluid.

21. The method of claim 20, wherein said step of cavitating the cavitation fluid to remove gas from the cavitation fluid further comprises the step of acoustically cavitating the cavitation fluid.

22. The method of claim 20, wherein said step of cavitating the cavitation fluid to remove gas from the cavitation fluid further comprises the step of cavitating the cavitation fluid with said cavitation piston.

23. The method of claim 17, wherein said degassing step is performed within a degassing chamber, the method further comprising the step of filling said cavitation chamber with the cavitation fluid after completion of said degassing step.

24. The method of claim 23, wherein said filling step is performed by pumping the cavitation fluid from the degassing chamber to the cavitation chamber via a circulatory system.

25. The method of claim 23, said degassing step further comprising the step of evacuating the degassing chamber containing the cavitation fluid.

26. The method of claim 23, said degassing step further comprising the steps of acoustically cavitating the cavitation fluid within the degassing chamber to remove gas from the cavitation fluid, and periodically evacuating the degassing chamber to remove the gas generated by the step of acoustically cavitating the cavitation fluid.

27. The method of claim 1, further comprising the step of reducing cross-contamination of the cavitation fluid and a hydraulic fluid within the hydraulic driver by interposing a coupling sleeve between the cavitation chamber and said hydraulic driver.

28. The method of claim 27, wherein said cross-contamination reducing step further comprises the step of evacuating said coupling sleeve.

29. The method of claim 1, wherein said extending step further comprises the step of extending the cavitation piston past the first partially withdrawn position.

* * * * *